United States Patent [19]

Yoshida

[11] Patent Number: 5,502,827
[45] Date of Patent: Mar. 26, 1996

[54] PIPELINED DATA PROCESSOR FOR FLOATING POINT AND INTEGER OPERATION WITH EXCEPTION HANDLING

[75] Inventor: Toyohiko Yoshida, Itami, Japan

[73] Assignee: Mitsubishi Denki Kabushiki Kaisha, Tokyo, Japan

[21] Appl. No.: 439,716

[22] Filed: May 12, 1995

Related U.S. Application Data

[63] Continuation of Ser. No. 135,869, Oct. 13, 1993, abandoned, which is a continuation of Ser. No. 614,339, Nov. 13, 1990, abandoned.

[30] Foreign Application Priority Data

Nov. 16, 1989 [JP] Japan .................................. 1-299395

[51] Int. Cl.⁶ ...................................... G06F 9/38
[52] U.S. Cl. ........................ 395/375; 395/800; 364/230; 364/231.8; 364/261.6; 364/DIG. 1
[58] Field of Search ................................ 395/800, 775, 395/550, 375; 364/131–134

[56] References Cited

U.S. PATENT DOCUMENTS

| | | | |
|---|---|---|---|
| 4,970,641 | 11/1990 | Hester et al. | 395/400 |
| 5,021,991 | 6/1991 | MacGregor et al. | 395/650 |
| 5,043,867 | 8/1991 | Bhandarkar et al. | 395/375 |
| 5,075,844 | 12/1991 | Jardine et al. | 395/375 |
| 5,095,426 | 3/1992 | Senta | 395/375 |
| 5,109,514 | 4/1992 | Garner et al. | 395/725 |
| 5,134,693 | 7/1992 | Saini | 395/375 |
| 5,193,158 | 3/1993 | Kinney et al. | 395/375 |

FOREIGN PATENT DOCUMENTS 1-92840   4/1989   Japan .................. G06F 9/46

OTHER PUBLICATIONS

"i486 Microprocessor," Intel Corp. 1989.
"A 1,000,000 Transistor Microprocessor," L. Kohn, et al 1989 ISSCC Digest of Papers, pp. 54–55.

Primary Examiner—Alyssa H. Bowler
Assistant Examiner—Alpesh M. Shah
Attorney, Agent, or Firm—Townsend and Townsend and Crew

[57] ABSTRACT

A data processor which is capable of executing two kinds of instructions, such as an integer operation instruction and a floating-point operation instruction, and which has bits in a PSW to control the timing of accepting an exception (FPU exception) generated when either of the instructions, such as the floating-point operation instruction, was executed, and which switches a mode that the FPU exception is either accepted at every end of the instructions or delayed until before execution of the following floating-point operation instruction, and which saves instruction addresses, operands, and the like related to the exception so as to perform effective processing of the FPU exception.

5 Claims, 21 Drawing Sheets

(SERIAL BIT NUMBER)

(ADDRESS)

←LOW ADDRESS    HIGH ADDRESS→
←MSB SIDE       LSB SIDE→

→→DIRECTION OF READ INSTRUCTION→→

Fig. 21

| MNEMONIC | CONTENT OF FLOATING-POINT OPERATION |
|---|---|
| FMOV | MOVE OF FLOATING-POINT OPERATION |
| FLDI | TRANSLATION FROM INTEGER TO FLOATING-POINT |
| FSTI | TRANSLATION FROM FLOATING-POINT TO INTEGER |
| FADD | ADDING OF FLOATING-POINT & FLOATING-POINT |
| FSUB | SUBTRACTING OF FLOATING-POINT & FLOATING-POINT |
| FMUL | MULTIPLYING OF FLOATING-POINT OPERATION |
| FDIV | DIVIDING OF FLOATING-POINT & FLOATING-POINT |
| FREM | RESIDUE OF DIVIDING OF FLOATING-POINT & FLOATING-POINT |
| FNEG | CHANGE OF FLOATING-POINT |
| FABS | ABSOLUTE VALUE OF FLOATING-POINT |
| FSQRT | SQUARE ROOT OF FLOATING-POINT |

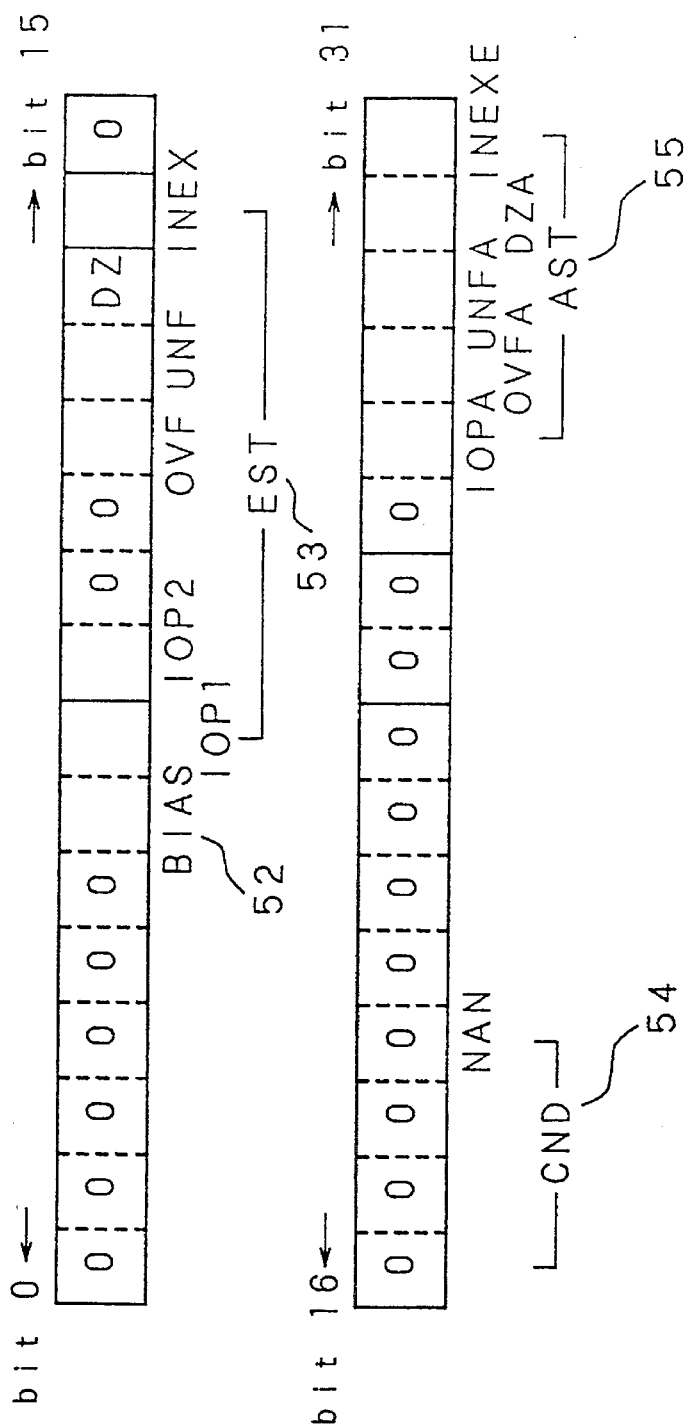

Fig. 28

| BAT | ADDRESS PIN | DATA PIN H | DATA PIN L | INSTRUCTION PIN |
|---|---|---|---|---|
| 000 | DATA ADDRESS | DATA H | DATA L | UNDEFINED |
| 001 | INSTRUCTION ADDRESS | UNDEFINED | UNDEFINED | INSTRUCTION CODE |
| 100 | COMMAND | OPERAND H | OPERAND L | UNDEFINED |
| 101 | COMMAND | UNDEFINED | PC | UNDEFINED |
| OTHERS | SAVED | UNDEFINED | UNDEFINED | UNDEFINED |

Fig. 30

| Vector | NAME OF EIT | Type | Format |
|---|---|---|---|
| 1 | DEBUG INTERRUPT | 3 | 3 |
| 16 | SELF DEBUG TRAP | 2 | 2 |
| 17 | BUS ACCESS EXCEPTION | 1 | 5 |
| 18 | ADDRESS TRANSLATION EXCEPTION | 1 | 5 |
| 19 | MISSING PAGE EXCEPTION | 1 | 5 |
| 20 | RESERVED INSTRUCTION EXCEPTION | 4 | 0 |
| 25 | ODD ADDRESS JUMP TRAP | 1 | 2 |
| 26 | ZERO DIVIDE TRAP | 1 | 2 |
| 29 | FLOATING-POINT OPERATION TRAP | 3 | 4 |
| 31 | CONDITIONAL TRAP | 1 | 2 |
| 32 | UNCONDITIONAL TRAP | 1 | 2 |
| 64 | EXTERNAL INTERRUPT | 3 | 0 |

PIPELINED DATA PROCESSOR FOR FLOATING POINT AND INTEGER OPERATION WITH EXCEPTION HANDLING

This is a Continuation of application Ser. No. 08/135,869; filed Oct. 13, 1993, now abandoned, which is a continuation of U.S. Ser. No. 07/614,339, filed Nov. 13, 1990, now abandoned.

BACKGROUND OF THE INVENTION

1. Field of the Invention

This present invention relates to a data processor which is capable of executing such two kinds of instructions as a first, kind of instruction and a second kind of operation instruction which is capable of being executed independently from the first kind of instruction, such as a data processor comprising the mechanism of integer operation and the mechanism of floating-point operation, and more in particular, to a data processor which is capable of effectively processing an exception which was generated when either of the two kinds of instructions, such as the floating-point operation instruction, was executed.

2. Description of Related Art

The conventional data processor is constructed to sequentially execute instructions, however, since processing speed of the data processor has been highered, there is proposed a data processor whose performance is greatly improved by providing pipeline processing for the instructions.

Such a data processor which provides pipeline processing for the instructions is disclosed in detail in U.S. Pat. No. 4,402,042 or Japanese Patent Application Laid-Open No. 63-193230 (1988) and the like, for example.

In addition to it, there is proposed a data processor which packages such two kinds of operation functions as a floating-point operation function and an integer operation function onto one semiconductor chip and performs parallel execution of an integer operation instruction and a floating-point operation instruction in order to improve processing performance of the data processor.

Such a data processor as performs parallel execution of the integer operation and the floating-point operation is disclosed in detail in Leslie Kohn and Sai-Wai Fu, "A 1,000,000 Transistor Microprocessor", 1989 ISSCC Digest of Papers, pp.54–55, for example.

Incidentally, it takes longer time to execute the floating-point operation than to execute the integer operation. As a result, where the integer operation instruction and the floating-point operation instruction are executed simultaneously by allowing an integer operation unit and a floating-point operation unit to perform parallel operation, there exists a problem that at what time point an exception which was generated when a floating-point operation instruction was executed is to be accepted. In other words, until the exception which was generated when the floating-point operation instruction was executed is detected, there is possibility that execution of several integer operation instructions which are described on the latter order of a program will be terminated earlier than execution of that floating-point operation instruction because of the difference of processing speed between the floating-point operation and the integer operation.

As a result, where the exception which was generated when the floating-point operation instruction was executed is adapted to be accepted surely before execution of the next floating-point operation instruction, it becomes necessary to check whether the exception which was generated when the floating-point operation instruction was executed is generated or not, at every time the floating-point operation is executed, which becoming an obstacle to improve performance of the data processor.

In order to avoid such inconvenience as described above, conventionally there has been proposed a data processor, wherein the exception which was generated when the floating-point operation instruction was executed is either accepted to be delayed until just before execution of the next floating-point operation instruction or accepted as external interruption.

Such a data processor, which is constructed to perform switching of mode that the exception which was generated when the floating-point operation instruction was executed is either accepted to be delayed until just before execution of the next floating-point operation instruction or accepted as external interruption, is disclosed in detail in "i486 MICROPROCESSOR Intel Corporation 1989", for example.

Where many instructions are executed after an exception was generated and then the exception is detected, however, it becomes difficult to specify the reason why the exception was generated. Then, where the exception is accepted before execution of the next floating-point operation instruction, it becomes an obstacle to improve performance of the data processor, however, where an exception is generated when a floating-point operation instruction is executed, it is convenient to detect the exception as soon as possible in processing of the exception.

On the contrary, where the exception generated when the floating-point operation instruction was executed is accepted to be delayed until just before execution of the next floating-point operation instruction, many integer operation instructions, jump instructions, and the like are executed during that time, then, it becomes difficult to specify address of the floating-point operation instruction which generated the exception or the reason why the exception was generated.

With the conventional data processor, such as i486 microprocessor manufactured by Intel Corp., delaying time from generating an exception to detecting the exception is adapted to be reduced by accepting the exception which was generated when the floating-point operation instruction was executed as external interruption, as a result, there exists a problem to additionally entail a signal pin for outputting the exception generated when the floating-point operation instruction was executed to the external. In addition, there is another problem to entail in the external of the microprocessor a control circuit which arbitrates signals showing both of other external interruption and the exception generated in execution of the floating-point operation instruction.

SUMMARY OF THE INVENTION

The foregoing problems are overcome in accordance with the present invention. The main object of the present invention is to provide a data processor which is capable of executing such two kinds of instructions as an integer operation instruction and a floating-point operation instruction, wherein it is possible to effectively process an exception which was generated when either of the two kinds of instructions, such as the floating-point operation instruction, was executed.

The first invention of the data processor of the present invention is provided with an integer operation unit as a first operation unit which executes the integer operation instruction as a first instruction, a floating-point operation unit as a second operation unit which operates in parallel with the integer operation unit and which executes the floating-point operation instruction as the second instruction, an execution control unit which accepts a floating-point operation trap which was generated in response to an instruction being executed in the floating-point operation unit and which activates an exception processing handler, and an FE bit which is located in a processor status word (PSW) and which switches the time point that the execution control unit accepts the floating-point operation trap either at the end of the floating-point operation instruction or just before execution of the next floating-point operation instruction.

In accordance with the first invention as described above, the integer operation instruction is executed in the integer operation unit, and the floating-point operation instruction is executed in the floating-point operation unit which operates in parallel relation with the integer operation unit, and the execution control unit which can switch the time point of accepting the floating-point operation trap, according to the value of the FE bit in the processor status word (PSW), activates the exception processing handler. And where the FE bit is "1", the floating-point operation trap is accepted immediately at the end of the instruction being on execution in the integer operation unit. When the FE bit is "0", even if the floating-point operation trap is generated, execution of the instruction is continued in the integer operation unit, and the floating-point operation trap is accepted just before the next floating-point operation instruction is executed in the floating-point operation unit.

The second invention is constructed to switch the value of the FE bit by the execution control unit when it accepts the floating-point operation trap and activates the exception processing handler.

In accordance with the second invention as described above, when the FE bit is "1", where the execution control unit accepts the floating-point operation trap at the end of the instruction being in the program and activates the exception processing handler, the value of PSW when the exception was generated is saved in a stack, and according to specifying of an exception processing vector, tile value of the FE bit is switched to "0".

The third invention is constructed to switch the value of the FE bit when the execution control unit, accepts the floating-point operation trap and activates the exception processing handler and the FE bit returns from the exception processing handler.

In accordance with the third invention as described above, in the exception processing handler, when the floating-point operation trap is detected, the exception is processed in a masked state excepting the time just before execution of the floating-point operation instruction and a wait instruction, and then, the generation state of the floating-point operation trap of the floating-point status word is cleared. In addition, when returning from the exception processing handler, an instruction to return the handler is executed to fetch the value of PSW from the stack, and according to this value of PSW, the value of FE bit is returned to its original value, returning to the original program.

The fourth and the fifth inventions are constructed in which the execution control unit is provided with a data input/output unit which stores, in an external memory, information of each operand and the operation results which became the cause of detecting the exception as well as address of the floating-point instruction which generated the floating-point operation trap, return address from the exception processing handler, and the like where the floating-point operation trap is generated when the floating-point operation for the first and the second operands is executed.

In accordance with the fourth and the fifth inventions as described above, where the floating-point operation trap is generated when the floating-point operation for the first and the second operands is executed, according to control of the execution control unit, information of each operand and the operation results which are the cause of detecting the exception as well as the address of the floating-point instruction which generated the floating-point operation trap and the address of an instruction being just before execution where the floating-point operation trap is accepted, that is, return address from the execution processing handler to the original program, which is address of the next instruction to be executed, and the like are stored in the external memory, and according to the above information, the cause of generating the exception is analyzed in the exception processing handler.

The above and further objects and features of the invention will more fully be apparent from the following detailed description with accompanying drawings.

BRIEF DESCRIPTION OF THE DRAWINGS

FIG. 21 is a schematic view for explaining a floating-point operation instruction of the data processor of the present invention, FIG. 26 is a schematic view to illustrate construction of a floating-point operation status word (FSW) of the data processor of the present invention, FIG. 28 is a table showing the meaning of BAT(0:2) signal of a data processor of the present invention, FIG. 30 is a schematic view showing the kinds, vector numbers, type number and stack formats of EIT of a data processor of the present invention.

DETAILED DESCRIPTION OF THE PREFERRED EMBODIMENTS

In the following, the present invention will be particularly described with reference to the drawings showing its embodiments.

(1) "Configuration of a System using a Data Processor of the Present Invention"

Figure 1:
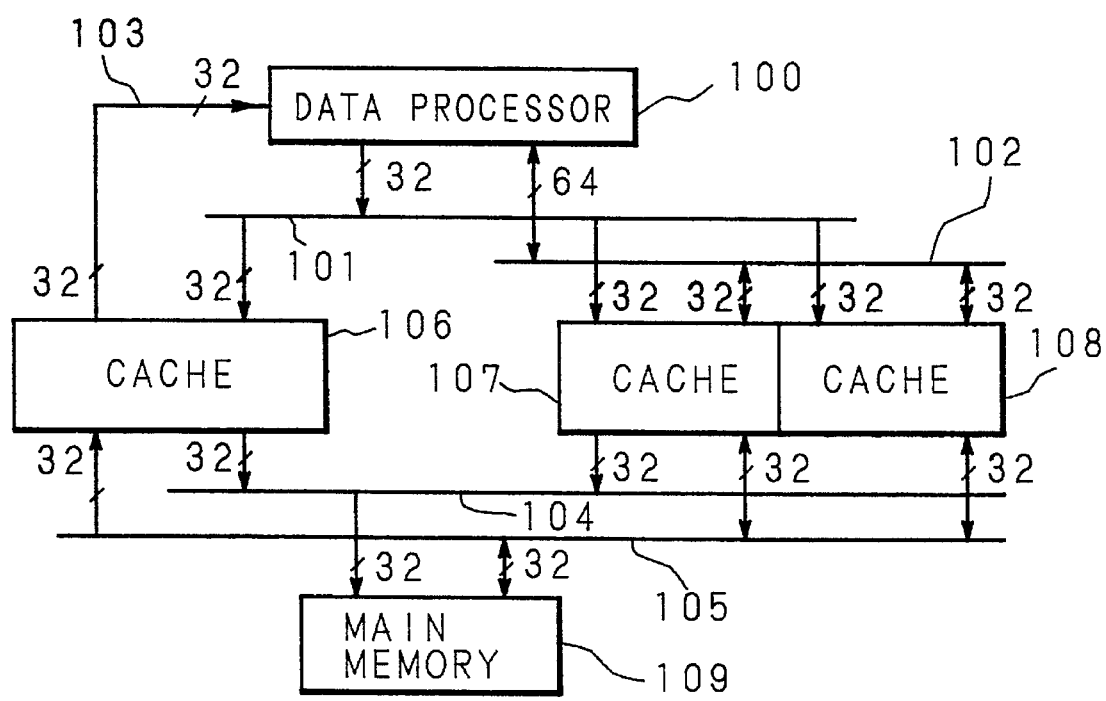
FIG. 1 is a block diagram showing an exemplary configuration of a data processing system using a data processor of the present invention.

FIG. 1 shows a configuration of a system using a data processor of the present invention.

In this configuration, a data processor 100 of the present invention, an instruction cache 106, data caches 107 and 108 and a main memory 109 are connected by an address bus 101, a data bus 102, an instruction bus 103, a memory address bus 104 and a memory data bus 105.

The address bus 101 inputs the address outputted from the data processor 100 of the present invention into the instruction cache 106 and the data caches 107, 108. The instruction bus 103 transfers the instruction code outputted from the instruction cache 106 to the data processor 100 of the present invention. The data bus 102 transfers data outputted from the data processor 100 of the present invention to the data caches 107, 108, or data outputted from the data caches 107, 108 to the data processor 100 of the present invention. The memory address bus 104 transfers the address outputted from the instruction cache 106 or the data caches 107, 108 to the main memory 109. The memory data bus 105 transfers the instruction or data between the main memory 109 and the instruction cache 106 or the data caches 107, 108.

When the instruction cache 106 and the data caches 107, 108 made a miss, the respective cache 106 or 107 arbitrates the bus authority of the memory address bus 104 and the memory data bus 105 to access the main memory 109.

In the data caches 107, 108, on the side of the data processor 100 of the present invention, two chips are operated in cooperation with each other to associate with a 64-bit bus. For each of the 64-bit data, the data cache 107 treats the high-order 32-bit data and the data cache 108 treats the low-order 32-bit data.

In the following, first, an instruction system and a processing mechanism of the data processor 100 of the present invention will be explained, and next, an exception processing method and an operand store operation will be explained in detail.

(2) "Instruction Format of the Data Processor of the Present Invention"

An instruction of a data processor of the present invention is formed on a 16-bit unit basis, being variable in length. No instruction with an odd number of bytes is used herein.

The data processor of the present invention has an instruction format, system specifically devised for the purpose of writing highly frequent instructions in a short format. For example, as to a two-operand instruction, two formats are provided; a general format which has basically a configuration of "four bytes+extension part(s)" and allows the utilization of all addressing modes and a short format allowing only the use of a highly frequent instruction and an addressing mode.

The meanings of symbols appearing in the instruction format of the data processor of the present invention shown in FIG. 2 to FIG. 6 are as follows:

—: Field wherein operation code is put.

Ea: Field for generating an operand in a general type 8-bit addressing mode.

Sh: Field for specifying an operand in a short type 6-bit addressing mode.

Rn: Field for specifying an operand in a register by the register number.

Figure 2:
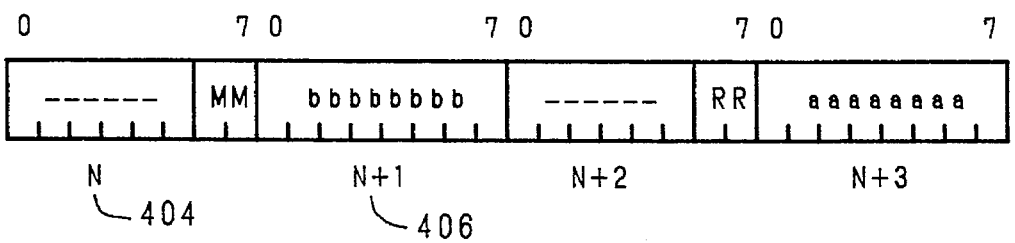
FIG. 2 through FIG. 6 are schematic views showing instruction formats of a data processor of the present invention.

In the format, as shown in FIG. 2, the right side 402 is the LSB side and is high address. The instruction format can be discriminated only after an address N 404 and an address N+1 406 are checked. As described above, this is because of a premise that the instruction is fetched and decoded on a 16-bit (half word) unit basis without fail.

In the data processor of the present invention, in the case with any format, the extension part of Ea or Sh of each operand is sure to be positioned immediately after 16 bits (half word) comprising the basic part of that Ea or Sh. This takes precedence over the immediate data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained addressing mode, this part takes precedence over the next operation field.

For example, consideration is made on the case of 6-byte instruction which comprises Ea1 in a first half word, Ea2 in a second half word, and ends with a third half word. In the case where the chained addressing mode is used for Ea1, and Ea2 has extension part, the actual instruction bit pattern is composed in the sequence of the first half word of instruction (including the basic part of Ea1), the chained addressing mode of Ea1, the second half word of instruction (including the basic part of Ea2), the extension part of Ea2 and the third half word of instruction.

(2.1) "Short-Format Two-Operand Instruction"

Figure 3:
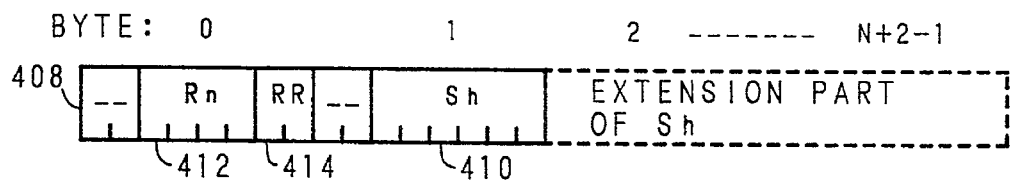

FIG. 3 is a schematic diagram showing short format of the two-operand instruction.

This format includes a L-format wherein the source operand side is a memory and a S-format wherein the destination operand side is a memory.

In the L-format, symbol Sh 410 represents the specifying field of the source operand, symbol Rn 412 represents the specifying field of the register of the destination operand and RR 414 represents specifying of the operand size of Sh 410, respectively. The size of the destination operand located in the register is fixed to 32 bits. Where the size of the resister side differs from that of the memory side and the size of the source side is smaller, sign extension is performed.

In the S-format, symbol Sh 410 represents the specifying field of the destination operand, symbol Rn 412 represents the register specifying field of the source operand and RR 414 represents specifying of the operand size of Sh 410, respectively. The size of the source operand located in the register is fixed to 32 bits. Where the size of the register side differs from that of the memory side and the size of the source side is larger, truncating of the overflow portion and overflow check are performed.

(2.2) "General-Format One-Operand Instruction"

Figure 4:
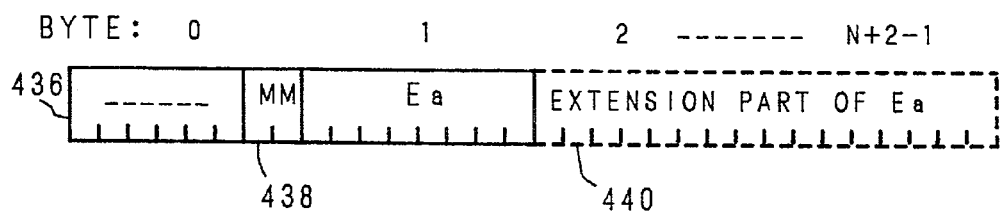

FIG. 4 is a schematic diagram showing a general format 436 of one-operand instruction (G1-format).

Symbol MM 438 represents the specifying field of the operand size. Some of the G1-format instructions comprise an extension part besides the extension part of Ea 440. There are also instructions using no MM 438.

(2.3) "General-Format Two-Operand Instruction"

Figure 5:
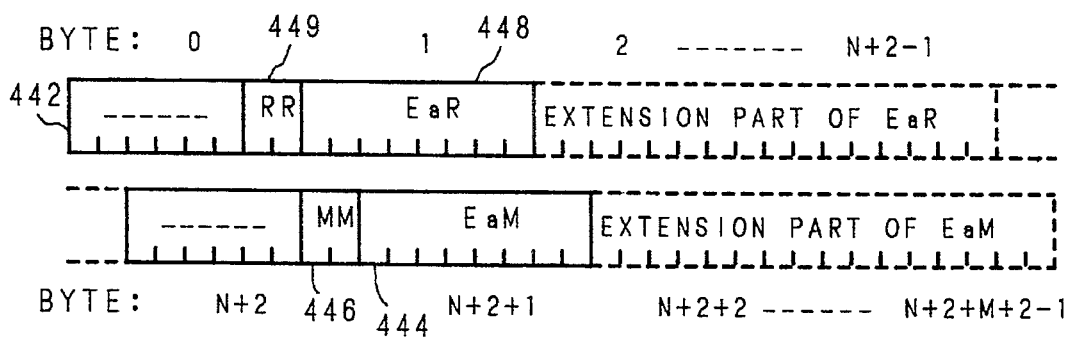

FIG. 5 is a schematic diagram showing general format of two-operand instruction.

This format comprises an instruction having a maximum of two operands of the general-type addressing mode which are specified by eight bits. There are cases where the total number of operands becomes three or more.

Symbol EaM 444 represents the specifying field of the destination operand, symbol MM 446 represents the specifying field of the destination operand size, EaR 448 represents the specifying field of the source operand, and RR 449 represents the specifying field of the source operand size.

Some of the G-format instructions comprise an extension part besides the extension part of EaM 444 and EaR 448.

Figure 6:
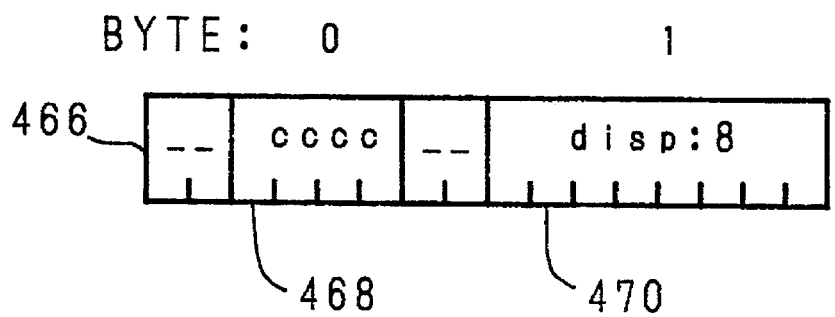

FIG. 6 is a schematic diagram showing a format 466 of a short branch instruction.

Symbol cccc 468 represents the specifying field of a branch condition, symbol disp:8 470 represents the specifying field of displacement, to a jump destination, and in the data processor of the present invention, when displacement is specified by eight bits, the displacement value is set by doubling the specified value in the bit pattern.

(2.4) "Addressing Mode"

The methods of specifying the addressing mode of the data processor of the present invention include the short type specified by six bits including the register and the general type specified by eight bits.

Where an undefined addressing mode has been specified, or where a combination of addressing modes obviously unsuitable has been specified, a reserved instruction exception is generated, likewise, the case where the undefined instruction has been executed, and exception processing is started.

Examples of these cases are the case where the destination is the immediate mode and the case where the immediate mode is used in the specifying field of the addressing mode to be accompanied by address calculation.

Meanings of symbols used in the format diagram shown in FIG. 7 to FIG. 10 is as follows:

Rn: Register specifying (Sh): Designating method by the short-type addressing mode of six bits (Ea): Designating method by the general-type addressing mode of eight bits In the format diagram, the portion surrounded by a broken line shows the extension part.

(2.4.1) "Basic Addressing Modes"

The data processor of the present invention supports various addressing modes. Among them, the basic addressing modes supported by the data processor of the present invention include a register direct mode, a register indirect mode, a register relative indirect mode, an immediate mode, an absolute mode, a Program Counter (PC) relative indirect mode, a stack pop mode and a stack push mode.

Figure 7:
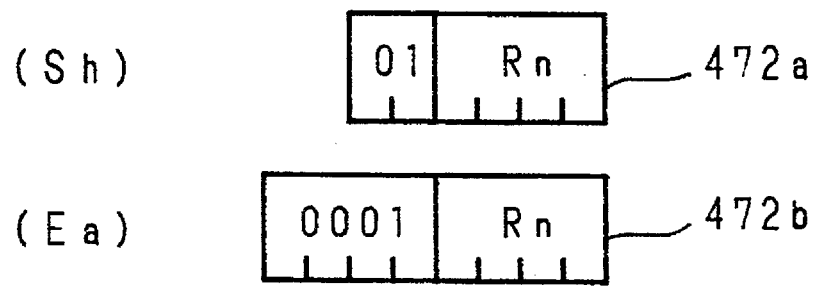
FIG. 7 through FIG. 20 are schematic views showing formats of an addressing mode specifying field in the instruction of the present invention.

The register direct mode takes the content of a register intact as an operand. FIG. 7 is a schematic diagram of the format thereof. Each symbol Rn 472a, 472b shows the number of the general-purpose register.

Figure 8:
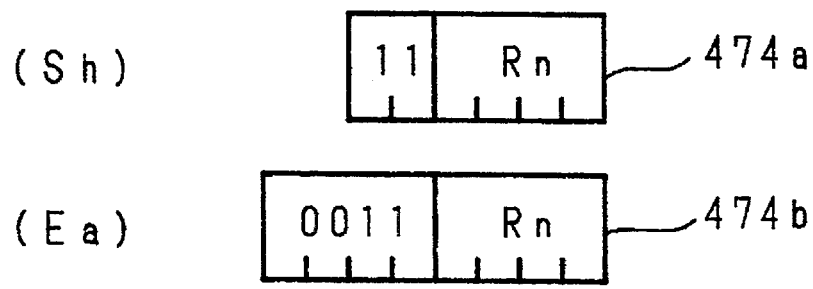

The register indirect mode takes as an operand the content of the memory whose address is the content of a registent. FIG. 8 is a schematic diagram of the format thereof. Each symbol Rn 474a, 474b shows the number of the general-purpose register.

Figure 9:
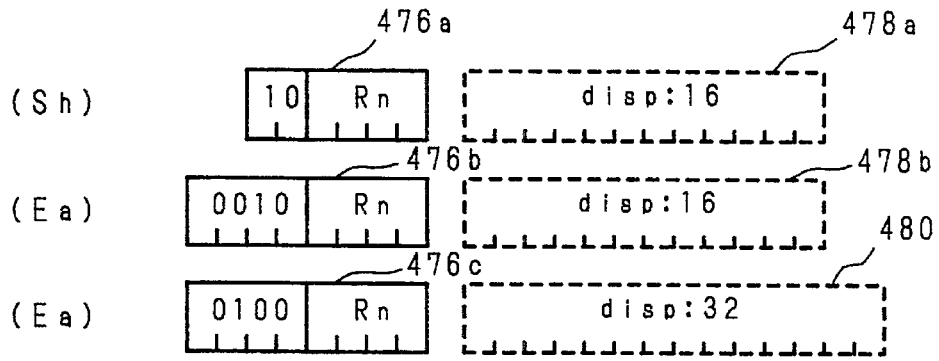

The register relative indirect mode includes two kinds (16 bits and 32 bits) of the displacement value. Each of them takes as an operand the content of the memory whose address is the value of the content of the register added to the displacement value of 16 bits or 32 bits. FIG. 9 is a schematic diagram of the format thereof. Each symbol Rn 476a, 476b, 476c shows the number of the general-purpose register. Each symbol disp:16 478a, 478b and disp:32 480 shows the displacement value of 16 bits and the displacement value of 32 bits, respectively. The displacement value is handled with a signed binary number.

Figure 10:
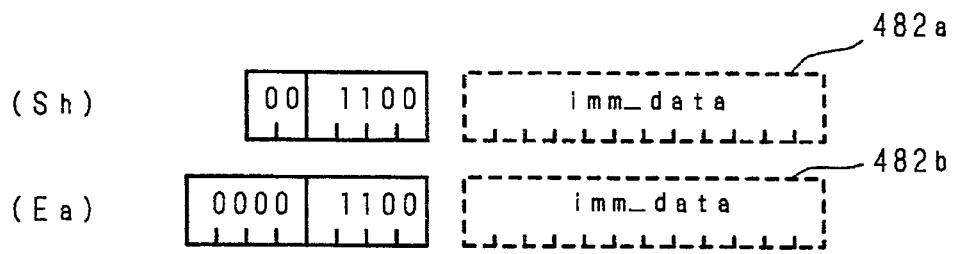

The immediate mode takes as an operand the bit pattern specified in the instruction code while assuming it intact as a binary number. FIG. 10 is a schematic diagram of the format thereof. Each symbol imm_data 482a, 482b shows the immediate. The size of imm_data is specified in the instruction as the operand size.

Figure 11:
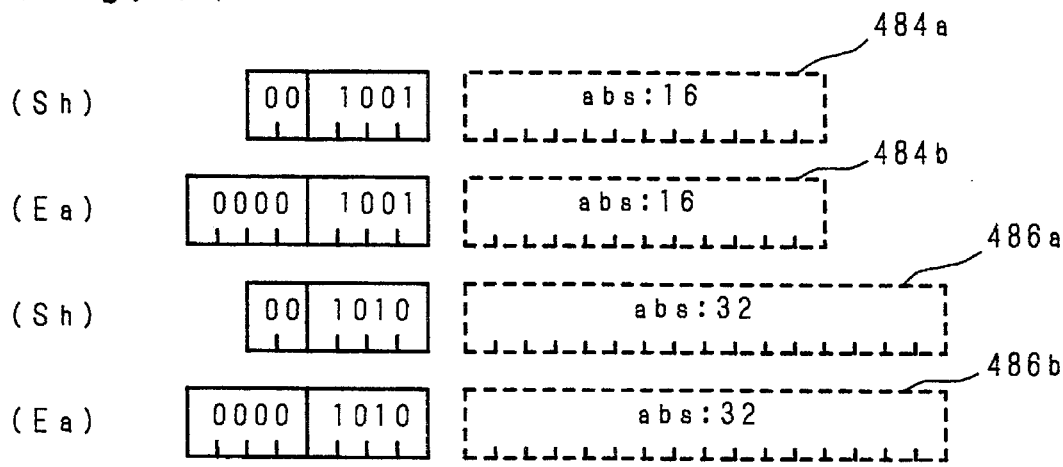

The absolute mode includes two kinds of field (16 bits and 32 bits) for showing the address value. Each kind takes as an operand the content of the memory whose address is the bit pattern of 16 bits or 32 bits specified in the instruction code. FIG. 11 is a schematic diagram showing the format thereof. Each symbol abs:16 484a, 484b and abs:32 486a shows the address value of 16 bits and 32 bits, respectively. When the address is shown by abs:16, the specified address value is sign-extended to 32 bits.

Figure 12:
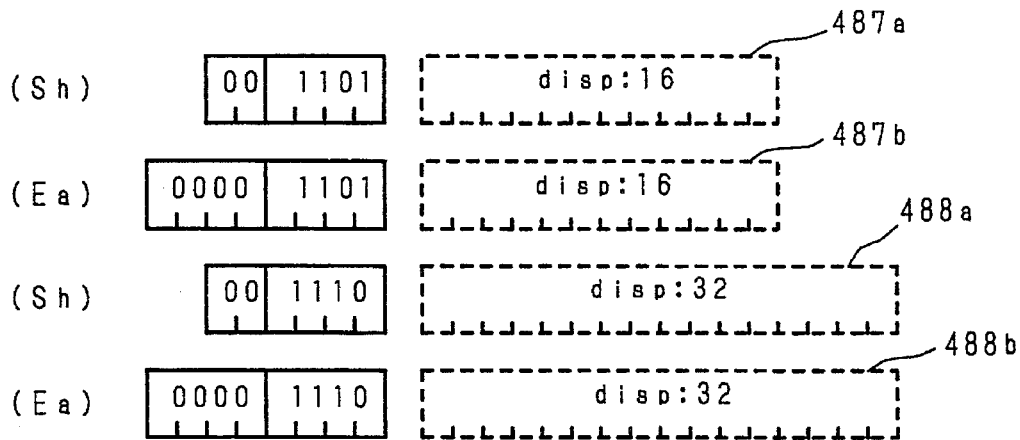

The PC relative indirect mode includes two kinds of field (16 bits and 32) for bits of the displacement value. Each takes as an operand the content of the memory whose address is the value of the content of a program counter whereto the displacement value of 16 bits or 32 bits is added. FIG. 12 is a schematic diagram showing the format thereof. Each symbol disp:16 486a, 486b and disp:32 488a, 488b shows the displacement value of 16 bits and the displacement value of 32 bits, respectively. The displacement value is handled with a signed binary number. In the PC relative indirect mode, the value of the program counter to be referred is the start address of the instruction comprising the operand. Where the value of the program counter is referred in the chained addressing mode, the start address of the instruction is also used as a reference value of PC relativity.

Figure 13:
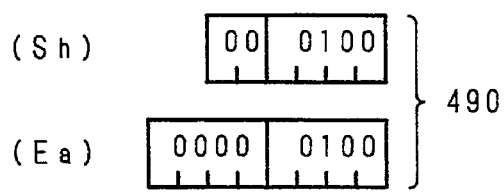

The stack pop mode takes as an operand the content of the memory whose address is the content of a stack pointer (SP). After operand access, the SP is incremented by the operand size. For example, where 32-bit data is handled, the SP is renewed (incremented) by +4 after the operand access. Designating of the stack pop mode for operands of sizes of 8 bits, 16 bits and 64 bits can also be performed, and the SP is renewed (incremented) by +1, +2 and +8, respectively. FIG. 13 is a schematic diagram of the format thereof. As to the one wherein the stack pop mode is invalid for the operand, a reserved instruction exception is generated. Specifically, the stack pop mode specifying for a write operand and a read-modify-write operand becomes the reserved instruction exception.

Figure 14:
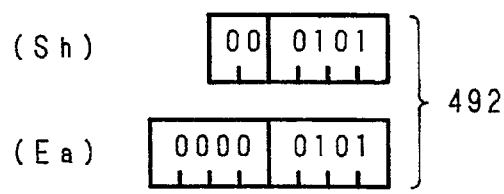

The stack push mode takes as an operand the content of the memory whose address is the content of the SP decremented by the operand size. In the stack push mode, the SP is decremented before operand access. For example, when handling 32-bit data, the SP is renewed (decremented) by −4 before operand access. It is also possible to specify the stack push mode for operands of sizes of 8 bits, 16 bits and 64 bits, and the SP is renewed (decremented) by −1, −2 and −8, respectively. FIG. 14 is a schematic diagram showing the format thereof. As to the one wherein the stack push mode is invalid for the operand, a reserved instruction exception is generated. Specifically, the stack push mode specifying a read operand and a read-modify-write operand becomes the reserved instruction exceptions.

(2.4.2) "Chained Addressing Mode"

Addressing, whatever complicated, can basically be decomposed into combinations of addition and indirect reference. Accordingly, operations of addition and indirect reference are given in advance as primitives of addressing, and in the case where they can be combined arbitrarily, any complicated addressing mode can be realized. The chained addressing mode of the data processor of the present invention is an addressing mode based on such a conception. A complicated addressing mode is particularly useful for data reference between modules or the processing system of AI (Artificial Intelligence) language.

When specifying the chained addressing mode, in the basic addressing mode specifying field, one is specified from among three kinds of specifying methods viz. a register base chained addressing mode, a PC base chained addressing mode and an absolute chained addressing mode.

Figure 15:

The register base chained addressing mode is an addressing mode taking the value of register as the base value of the chained addressing to be extended. FIG. 15 is a schematic diagram showing the format 494 thereof. Symbol Rn 496 shows the number of the general-purpose register.

Figure 16:

The PC base chained addressing mode is an addressing mode taking the value of the program counter (PC) as the base value of the chained addressing to be extended. FIG. 16 is a schematic diagram showing the format 498 thereof.

Figure 17:
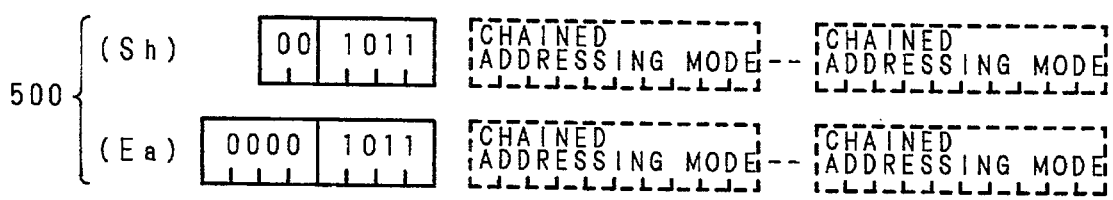

The absolute base chained addressing mode is an addressing mode taking zero as the base value of the chained addressing to be extended. FIG. 17 is a schematic diagram of the format 500 thereof.

Figure 18:
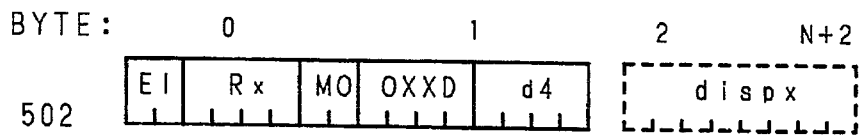

The chained addressing mode specifying field to be extended takes 16 bits as a unit, and this is repeated number of times. In each stage of the chained addressing mode, addition of displacement, scaling (×1, ×2, ×4, ×8) and addition of an index register, and indirect reference of memory are performed. FIG. 18 is a schematic diagram showing the format 502 of the chained addressing mode. Each field has meanings as shown below.

E=0: Chained addressing mode is continued.

E=1: Address calculation ends. tmp →address of operand

I=0: No memory indirect reference is performed. tmp+disp+Rx * Scale →tmp

I=1: Memory indirect reference is performed. mem [tmp+disp+Rx * Scale]→tmp

M=0: <Rx> is used as an index.

M=1: Special index

<Rx>=0 Index value is not added (Rx=0).

<Rx>=1 Program counter is used as an index value (Rx =PC).

<Rx>=2 or more Reserved.

D=0: The value of field d4 of four bits in the chained addressing mode is quadrupled to be taken as a displacement value, and this value is added. The d4 is handled with a signed binary number, and is used by surely quadrupling it irrespective of the size of the operand.

D=1: The dispx (16/32 bits) specified in the extension part of the chained addressing mode is taken as a displacement value, the size of the extension part whereto this value is added is specified in the d4 field.

d4=0001 dispx: 16 bits d4=0010 dispx: 32 bits

XX: Index scale (scale=1/2/4/8)

Where scaling of ×2, ×4, ×8 has been performed for the program counter, an indefinite value is entered as an intermediate value (tmp) after completion of processing of that stage. The effective address obtained by this chained addressing mode becomes an unpredictable value, but no exception is generated. Designating of scaling for the program counter should not be performed.

Figure 19:
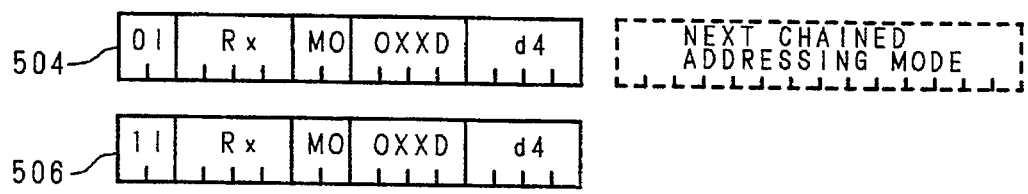
Figure 20:
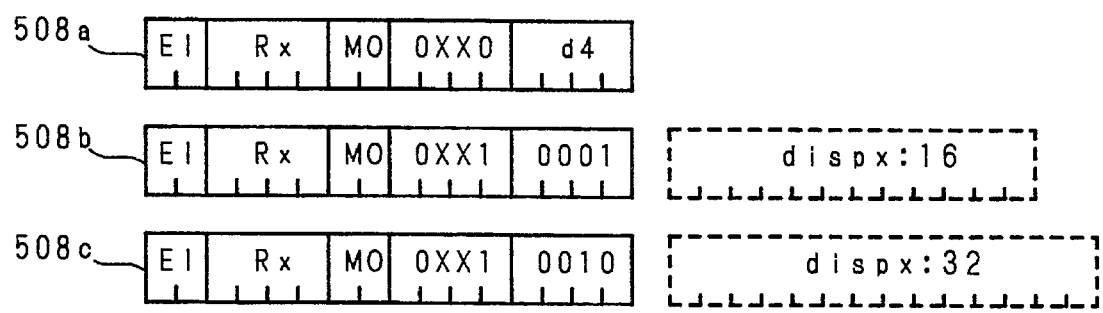

FIGS. 19 and 20 show variations on the instruction format formed by the chained addressing mode.

FIG. 19 shows variations of continuation 504 and completion of the chained addressing mode.

FIG. 20 shows variations 508a, 508b, 508c on the size of displacement.

In the case where the chained addressing mode of an arbitrary number of stages can be utilized, case-sorting in the compiler, based on the number of stage, can be dispensed with, and therefore an advantage of alleviating the burden on the compiler is obtainable. This is because, even if frequency of chained reference is very low, the compiler has to be able to generate a correct code without fail. For this reason, up to an arbitrary number of stages can be applied in the format.

(2.5) "Floating-Point Operation Instruction"

The integer operation instruction of the data processor of the present invention is disclosed in detail in Japanese Patent Application Laid-Open No. 1-92840 (1989), for example.

The integer operation instruction of the data processor of the present invention is as shown in FIG. 21, and is provided with each instruction to execute operation for a floating-point of a double-precision type and a floating-point of a single-precision type, both of which are provided by U.S. IEEE Standard.

The floating-point operation to be executed by the data processor of the present invention is described in detail in ANSI/IEEE Std 754-1985, "IEEE Standard for Binary Floating-Point Arithmetic".

(3) "Configuration of Function Block"

FIG. 21 is a block diagram showing a configuration of the data processor of the present invention.

The interior of the data processor of the present invention is functionally divided roughly into an instruction input unit 110, an instruction fetch unit 111, an instruction decoding unit 112, a first micro ROM unit 113, a second micro ROM unit 114, an operand address calculation unit 115, a PC calculation unit 116, an integer operation unit 117, a floating-point, operation unit 118, an address input/output unit 119, an operand access unit 120 and a data input/output unit 121.

The system configuration as abovementioned and shown in FIG. 1 can be realized by connecting the address input/output unit 119 to the address bus 101, the data input/output unit 121 to the data bus, and the instruction input unit 110 to the instruction bus 103.

(3.1) "Instruction Input Unit"

The instruction input unit 110 inputs instruction codes by 32 bits to the data processor of the present invention from the external instruction bus 103.

There are two access modes for the instruction cache 106. One is a standard access mode wherein 32 bits instruction code is accessed with respect to one address. Another is a quad access mode wherein 32 bits instruction code is continuously accessed by four times with respect to one address. In both cases, the instruction input unit 110 outputs the inputted instruction code to the instruction fetch unit 111.

(3.2) "Instruction Fetch Unit"

The instruction fetch unit 111 which comprises an address translation mechanism for an instruction address, a built-in instruction cache, a TLB for instruction, an instruction queue and a controlling unit thereof.

The instruction fetch unit 111 translates the logical address of the instruction to be fetched next, fetches the instruction code from the built-in instruction cache, and outputs it to the instruction decoding unit 112. In the case where the built-in instruction cache makes miss, the instruction fetch unit 111 outputs the physical address to the address input/output unit 119 to request an instruction access for exterior, so that the instruction code inputted through the instruction input unit 110 is registered to the built-in cache.

The logical address of an instruction to be fetched next is calculated by a dedicated counter as the logical address of the instruction to be inputted to an instruction queue. In the case where a jump is generated, a logical address of a new instruction is transferred from the operand address calculation unit 115, PC calculation unit 116 or the integer operation unit 117.

A control circuit inside the instruction fetch unit 111 also executes address translation and updating of the TLB for instruction by paging in the case where the TLB for instruction makes miss.

Also, in the case where the data processor of the present invention is under the bus watch mode, an entry, which is hit by the physical address inputted through the address input/output unit 109, of the built-in instruction cache is made invalid.

(3.3) "Instruction Decoding Unit"

In the instruction decoding unit 52, basically an instruction code is decoded on a 16-bit (half word) basis. This block comprises a FHW decoder for decoding an operation code included in the first half word, a NFHW (not first half word) decoder for decoding an operation code including in the second and the third half words, and an addressing mode decoder for decoding an addressing mode.

There are also the second stage decoder which further decodes an output of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 112 decodes the instruction code being inputted from the instruction fetch unit, 111 by 0 bytes through 6 bytes bytes per one clock. Among the results of decoding, information on operation in the integer operation unit 117 is outputted to the first micro ROM unit 113, information oil operation in the floating-point operation unit 118 is outputted to the second micro ROM unit 114, information on operand address calculation is outputted to the operand address calculation unit 115, and information on PC calculation is outputted to the PC calculation unit 116, respectively.

(3.4) "First Micro ROM Unit"

The first micro ROM unit 113 comprises a micro ROM for storing microprograms which mainly controls the integer operation unit, 117, a microsequencer, and a microinstruction decoder.

A microinstruction is read out from the micro ROM once per one clock. The microsequencer accepts processings of exception, interruption and trap (these three are generally called EIT) in addition to the sequential processings of the microprograms corresponding t each EIT, besides the sequential processing for execution of the microprogram relating to instruction execution.

To the first micro ROM unit 113, there are inputted interruption independent of the instruction code and branch condition of the microprogram by the result of integer operation execution.

Output of the microdecoder is mainly given to the integer operation unit 117, but some information is outputted also to other blocks at execution of jump instruction and acceptance of execution.

(3.5) "Second Micro ROM Unit"

In the second micro ROM unit 114, a micro ROM in which various microprogram routines for controlling a floating-point operation unit 118 are stored, a microsequencer, a microinstruction decoder and so on are included.

The microinstruction is read from the micro ROM once in one clock. The microsequencer also processes the exception related to the floating-point operation besides the sequence processing indicated by the microprogram, and when the floating point exception not masked is detected, requests the exception processing to the first micro ROM unit 113. The microsequencer of the second micro ROM unit 114 operates in parallel to the microsequencer of the first micro ROM unit 113, and controls the floating-point operation unit 118 in parallel to an integer operation unit 117.

To the second micro ROM unit 114, flag information resulted from the floating-point operation execution is also inputted.

Though output of the microdecoder is mainly outputted to the floating-point operation unit 118, a part of information such as detection of the exception related to the floating-point operation is also outputted to the other functional blocks.

(3.6) "Operand Address Calculation Unit"

The operand address calculation unit 115 is controlled in a hardwired manner by information on operand address calculation outputted from the address decoder of the instruction decoding unit 112 or the like. In this operand address calculation unit 115, operand address calculation other than the memory access for the memory indirect addressing, and jump target address calculation of the jump instruction are executed.

The result, of operand address calculation is sent to the integer operation unit 117. In pre-jump processing at the completion of operand address calculation, the result of jump target address calculation is outputted to the instruction fetch unit 111 and the PC calculation unit 116.

An immediate value operand is outputted to the integer operation unit 117 and the floating-point operation unit 18. The values of the general-purpose register and the program counter required for address calculation are inputted from the integer operation unit 117 or the PC calculation unit 116.

(3.7) "PC Calculation Unit"

The PC calculation unit 116 is controlled in a hardwired manner using information on PC calculation outputted from the instruction decoding unit 112. The PC calculation unit 116 calculates the PC value of an instruction.

The data processor of the presents invention has a variable-length instruction set, and the length of that instruction can be found only after the instruction is decoded. For this reason, the PC calculation unit 116 generates the PC value of the next instruction by adding the length of the instruction outputted from the instruction decoding unit 112 to the PC value of the instruction in decoding.

The result of calculation in the PC calculation unit 116 is outputted as the PC value of each instruction together with the result of decoding of the instruction.

In pre-branch processing at the instruction decoding stage, an address of branch destination instruction is calculated by adding a branch width outputted from the instruction decoding unit 11 and the PC value.

Also, the PC calculation unit 116 is provided with a PC stack for holding a copy of PC value, which is push to the stack at executing a jump instruction for the subroutine, of return destination from the subroutine. The PC calculation unit 116, for the return instruction from the subroutine, executes processing of generating an address of pre-return destination by reading out the return destination PC value from the PC stack.

(3.8) "Integer Operation Unit"

The integer operation unit 117 is controlled by the microprogram stored in a micro ROM of the first micro ROM unit 113, and executes operations necessary for realizing the function of each integer operation instruction, using the register file and arithmetic unit in the integer operation unit 117.

In the register file, a general register and a working register are included. In the integer operation unit 117, a flag which is varied by the result of integer operation and processor status word (PSW) including the bits which decide the external interruption mask level and the debug environment are included.

When an operand to be calculated by an instruction is an address or an immediate value, the immediate value or calculated address is inputted from the operand address calculation unit 115. Also, when an operand to be calculated by an instruction is data on the memory, the address calculated in the address calculation unit 115 is outputted to the operand access unit 120, and the operand fetched from the internal data cache or the outside is inputted to the integer operation unit 117.

In operation, in the case where the internal data cache, external data caches 107, 108 or the main memory 109 must be read, the integer operation unit 117 outputs the address to the operand access unit 120 and fetches target data by direction of the microprogram.

When it is necessary to store the operation result in the internal data cache, external data caches 107, 108 or the main memory 109, the integer operation unit 117 outputs the address and data to the operand access unit 120 by direction of the microprogram. At this time, from the PC calculation unit 116, the PC value of the instruction executing the storing operation is outputted to the operand access unit 120.

When external interruption and exception are processed and the integer operation unit 117 receives the new instruction address, the integer operation unit 117 outputs the new instruction address to the instruction fetch unit 111 and the PC calculation unit 116.

(3.9) "Floating Point Operation Unit"

The floating-point operation unit 118 is controlled by the microprogram stored in a micro ROM of the second micro ROM unit 114, and executes operations necessary for realizing the function of each floating-point operation instruction, using the register file and operation device in the floating-point operation unit 118.

The floating-point operation unit 118 is provided with a floating-point operation mode control register (FMC) which sets modes of a rounding-processing method of the floating-point operation and of detection permit of the floating-point operation exception and a floating-point operation status word (FSW) which is comprised of a flag for the floating-point operation results and a status bit showing the generation state of the exception in execution of floating-point operation.

When an operand to be calculated by an instruction is an immediate value, the immediate value is inputted to the floating-point operation unit 118 from the operand address calculation unit 115. When an operand to be calculated by an instruction is data on the memory, the address calculated in the address calculation unit 115 is outputted to the operand access unit 120, and the operand fetched from the internal data cache or the outside is inputted to the floating-point operation unit 118.

When it is necessary to store the operand in the internal data cache, external data caches 107, 108 or the main memory 109, the floating-point operation unit 118 outputs data to the operand access unit 120 by direction of the microprogram. In storing operation, the floating-point operation unit 118 and the integer operation unit 117 operate in corporation with each other to output the operand address from the integer operation unit 117, and the operand from the floating-point operation unit 118 to the operand access unit 120. At this time, from the PC calculation unit 116, the PC value of the instruction executing the storing operation is outputted to the operand access unit 120.

(3.10) "Operand Access Unit"

The operand access unit 120 comprises an address translating mechanism of the operand address, a built-in data cache, a TLB for data, a store buffer and controllers thereof.

In data loading operation, the operand access unit 120 translates the logical address of data, which is outputted from the operand address calculation unit 115 or the integer operation unit 117 and to be loaded, into the physical address, fetches data from the built-in data cache and outputs to the integer operation unit 117 or the floating-point operation unit 118. When the built-in data cache made a miss, the operand access unit 120 outputs the physical address to the address input/output unit 119, requests external data access and registers the data inputted through a data input/output unit 122 in the built-in data cache.

In data storing operation, the operand access unit 120 translates the logical address of data, which is outputted from the integer operation unit 117 and to be stored, into the physical address, stores the data outputted from the integer operation unit 117 or the floating-point operation unit 118 in the built-in data cache, and at the same time, outputs the physical address to the address input/output unit 119 through the store buffer and the data to the outside through the data input/output unit 122. In the store buffer, data to be stored and its address, and further the address of the instruction executing the storing operation are managed in one set. The storing operation in the store buffer is managed by an FIFO (first-in first-out) control method.

Address translation and updating of TLB for data by paging, in the case where the TLB for data made a miss, are performed by an internal control circuit in the operand access unit 120. Also, whether the memory access address is included in an I/O area mapped in the memory is checked.

In the case where the data processor of the present invention is under a bus watching mode, the operand access unit 120 repeals the entry of built-in data cache hit by the physical address inputted through the address input/output unit 119.

(3.11) "Address Input/Output Unit"

The address input/output unit 119 outputs the address outputted from the instruction fetch unit 111 and the operand access unit 120 to the outside of the data processor 100 of the present invention.

The address is outputted in accordances with a bus protocol defined in the data processor 100 of the present invention.

The bus protocol is controlled by an external bus control circuit in the address input/output unit 119. In the external bus control, the missing page exception, bus access exception and external interruption are also received.

When external device other than the data processor 100 of the present invention is a bus master and the data processor 100 of the present invention is under the bus watching mode, the address input/output unit 119 fetches the address outputted on the address bus 101 when the external device executes the data write cycle, and transfers to the instruction fetch unit 111 and the operand access unit 120.

(3.12) "Data Input/Output Unit"

The data input/output unit 121, at operand loading operation, fetches data from the data bus 102 and transfers it to the operand access unit 120, and at operand storing operation, outputs the operand outputted from the operand access unit 120 to the data bus 102.

As the accessing method of the data caches 107, 108, there are a standard access mode in which 64-bit data are accessed for one address, and a quad accessing mode in which 64-bit data are accessed continuously four times for one address, in either case, the data input/output unit 121 inputs and outputs the data exchanged between the operand access unit 120 and the external memory.

(4) "Pipeline Processing"

The data processor 100 of the present invention performs the pipeline processing of the instruction and operates very efficiently, by effective accessing of the memory using various buffer memories, the instruction bus 103 and the data bus 102.

Here, a pipeline processing method of the data processor 100 of the present invention will be described.

(4.1) "Pipeline Mechanism"

Figure 22:
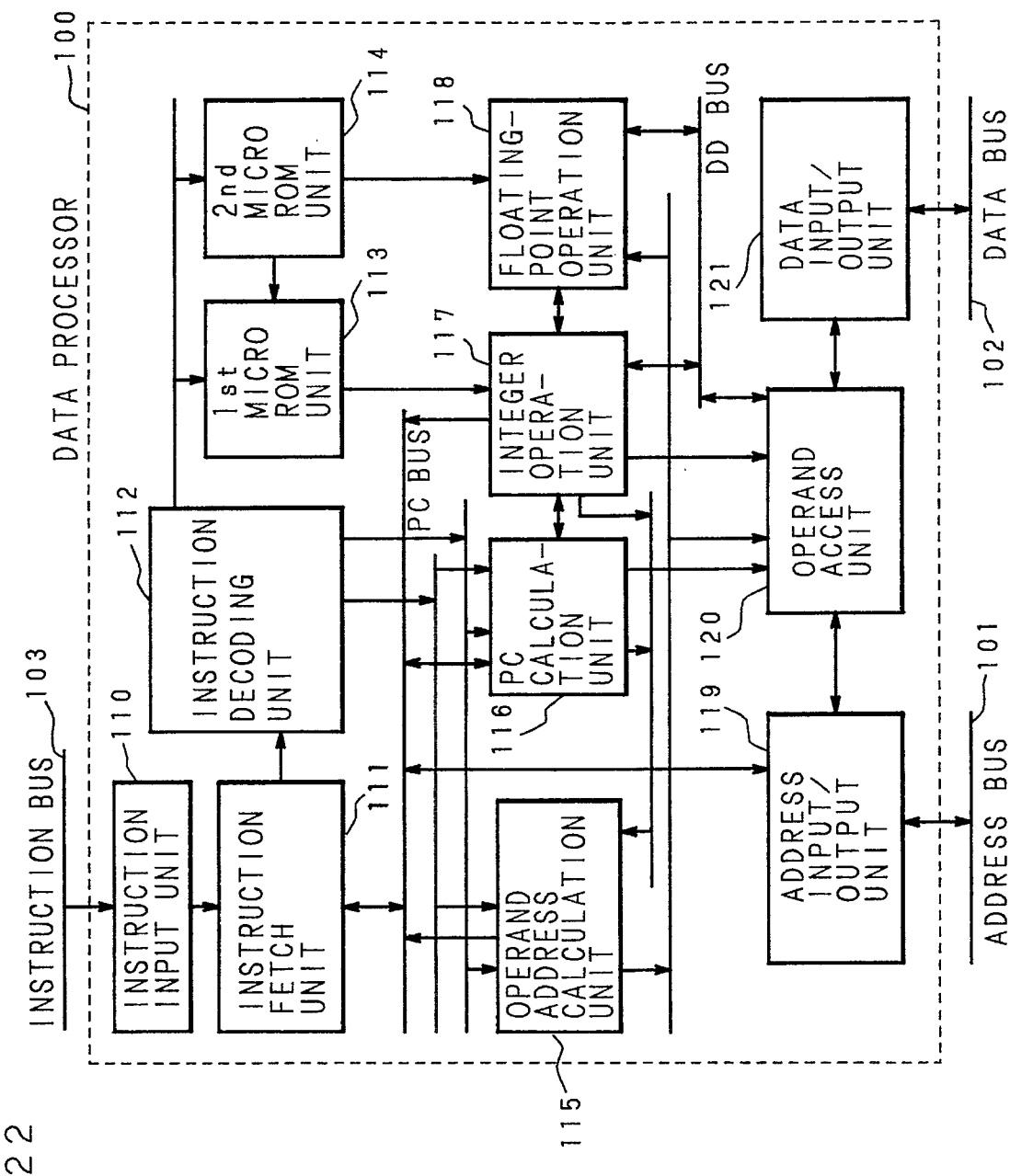
FIG. 22 is a block diagram showing a general configuration of a data processor of the present invention.
Figure 23:
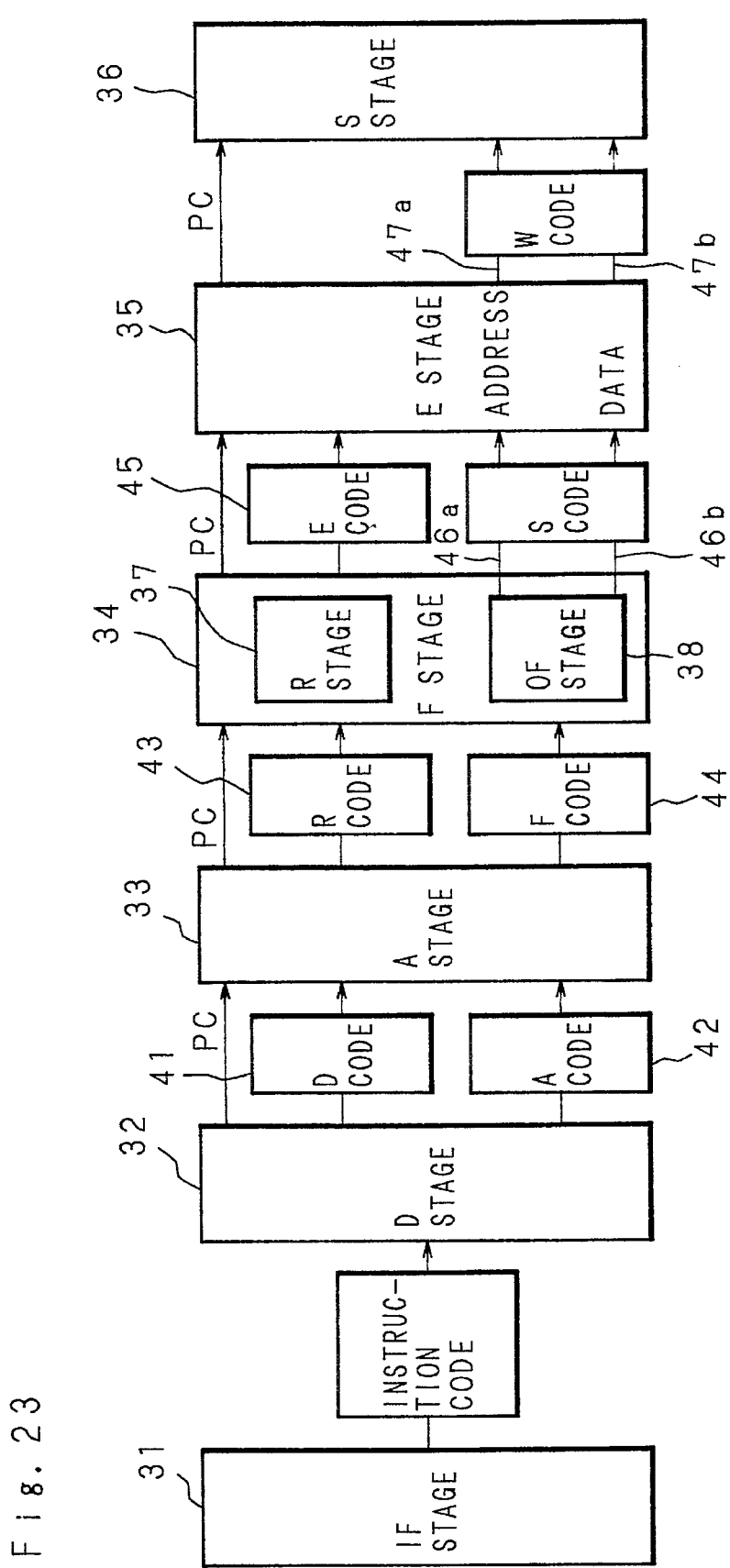
FIG. 23 is a schematic view for explaining a pipeline processing stage of a data processor of the present invention.

A pipeline processing mechanism of the data processor 100 of the present invention is constituted as shown schematically in FIG. 22.

The pipeline processing is executed in six-stage configuration of an instruction fetch stage (IF stage) 31 which prefetches instructions, a decoding stage (D stage) 32 for decoding the instruction, an operand address calculation stage (A stage) 33 which performs address calculation of the operand, an operand fetch stage (F stage) 34 which performs the micro ROM access (particularly referred to as an R stage 37) and the operand prefetch (particularly referred to as an OF stage 38), an execution stage (E stage) 35 for executing the instruction and a store stage (S stage) 36 which stores the memory operand.

In the S stage 36, there are 3-stage store buffer.

Each stage operates independently of the other stages and, theoretically, the six stages operate completely independently.

Each stage other than the S stage 36 performs one processing in one clock at a minimum. The S stage 36 performs one operand storing in two clock at a minimum. Thus, in the case where there is no memory operand storing, theoretically, the pipeline processing is proceeded sequentially in every one clock.

In the data processor of the present invention, though there is the instruction which can not be processed by only one basic pipeline processing such as the memory-memory operation or the memory indirect addressing, it is so constituted that the balanced pipeline processing be also performed for these processings if possible.

For the instruction having a plural number of memory operands, the pipeline processing is performed by decomposing into plural pipeline processing units (step code) in the decoding stage in response to the number of memory operands.

Information given to the D stage 32 from the IF stage 31 is the instruction code itself.

Information given to the A stage 33 from the D stage 32 are, a code (referred to as a D code 41) related to the operation specified by the instruction, a code (referred to as an A code 42) related the operand address calculation and a program counter value (PC) of the instruction being processed.

Information given to the F stage 34 from the A stage 33 are, an R code 43 including the entry address of the microprogram routine and parameters to the microprogram, a F code 44 including the operand address and accessing indicating information, and the program counter (PC) value of the instruction being processed.

Information given to the E stage 35 from the F stage 34 are, an E code 45 including operation control information and literal, S codes (46a, 46b) including the operand and operator address and the PC value of the instruction being processed.

The S codes 46a, 46b comprise an address 46a and data 46b.

Information given to the S stage 36 from the E stage 35 are W codes 47a, 47b which are the operation results to be stored and the PC value of the instruction outputting the operation results.

The W codes 47a, 47b comprise an address 47a and data 47b.

An EIT detected in the stages before the E stage 35 does not start EIT processing until the code thereof reaches the E stage 35. It is because that, only the instruction processed in the E stage 35 is the instruction in the execution step, and the instruction processed in the IF stage 31 through F stage 34 is still not in the execution step. Accordingly, detection of the EIT before the E stage 35 is registered in the step code and just transmitted to the next stage.

The EIT detected in the S stage 36 is received at the time point where execution of the instruction being processed in the E stage 35 is completed or at cancellation of the processing of the instruction, and returned to the E stage 35 for processing.

(4.2) "Processings in Each Pipeline Stage"

The input/output step codes to respective pipeline stages are named, as shown in FIG. 21, for the sake of convenience. In the step codes, there are two kinds, the one which becomes the parameter for the micro ROM entry address and the E stage 35 by performing the processing related to the operation code, and the other which becomes the operand to be processed in the E stage 35.

Between the D stage 32 and the S stage 36, the PC value of the instruction being processed is received and given.

(4.2.1) "Instruction Fetch Stage"

In the instruction fetch stage (IF stage) 31, the instruction fetch unit 111 is operated.

The instruction fetch unit 111 fetches the instruction from the built-in instruction cache or the outside and inputs to an instruction queue, and outputs the instruction code to the D stage 32 in a unit of 2 to 6 bytes. Input of instructions to the instruction queue is performed in a unit of aligned 4 bytes.

When the instruction fetch unit 111 fetches the instruction from the outside under a standard access mode, it requires at least 2 clocks for the aligned 4 bytes.

Under a quad access mode, at least 5 clocks are necessary for 16 bytes.

When the built-in instruction cache is hit, fetch is possible in 1 clock for the aligned 8 bytes.

Output unit of the instruction queue is variable by every 2 bytes, and can be outputted to 6 bytes in 1 clock at a maximum. Right after the jump, the instruction queue may be bypassed and the two bytes of instruction base part is transferred directly to the instruction decoder.

Translation of the logical address of the instruction into the physical address, control of the built-in instruction cache and TLB for instruction, management of the prefetch destination instruction address or control of the instruction queue are performed in the IF stage 31.

(4.2.2) "Instruction Decoding Stage"

The instruction decoding stage (D stage) 32 decodes the instruction code inputted from the IF stage 31.

The instruction code is decoded once in one clock using an FHW decoder, and NFHW decoder and an addressing mode decoder in the instruction decoding unit 112, and 0 to 6-byte instruction code is consumed in one decoding (the instruction code is not consumed in the output processing of the step code including tile return destination address of the return subroutine instruction).

In one decoding, an A code 42 as address calculation information and a D code 41 as an intermediate decoding result of the operation code are outputted to the A stage 33.

In the D stage 32, control of the PC calculation unit 116 of each instruction and the output processing of the instruction code from the instruction queue are performed.

In the D stage 32, pre-jump processing is performed for the branch instruction or return instruction from the subroutine. For the unconditional branch instruction which made pre-jumping, the D code 41 and A code 42 are not outputted and the instruction processing is completed in the D stage 32.

(4.2.3) "Operand Address Calculation Stage"

Processing of an operand address calculation stage (A stage) 33 is roughly divided into two.

One is the post-stage decoding processing of the operation code using the second decoder of the instruction decoding unit 112, and the other one is the calculation processing of the operand address in the operand address calculation unit 54.

In the post-stage decoding processing of the operation code, the D code 41 is inputted and the R code 43 including the entry address of the write reservation of the register and memory and the microprogram routine and parameters for the microprogram is outputted.

Incidentally, the write reservation of the register and memory is for preventing, when the content of the register or the memory referred at address calculation is rewritten by the preceding instruction in the pipeline, the wrong address calculation.

In the operand address calculation processing, the A code 42 is inputted and in accordance with the A code 42, the operand address is calculated in the operand address calculation unit 54 to output the calculation result as the F code 44.

For the jump instruction, the jump destination address is calculated and the pre-jump processing is executed. At this time, the write reservation is checked when the register is read in connection with the address calculation, and when the preceding instruction has been indicated that there is the reservation because the writing processing for the register or memory is not completed, the preceding instruction is in the waiting state until the writing processing is completed in the E stage 35.

In the A stage 33, for the jump instruction which has not pre-jumped in the D stage 32, the pre-jump processing is performed.

For a jump to the absolute value address or a jump of the register indirect addressing, pre-jumping is performed in the A stage 33. For tile unconditional jump instruction performing the pre-jumping, the R code 43 and F code 44 are not outputted and the instruction processing is completed in the A stage 33.

(4.2.4) "Micro ROM Access Stage"

Processing of an operand fetch stage (F stage) 34 is also divided roughly into two.

One is the access processing of the micro ROM, particularly referred to as an R stage 37, and the other one is the operand prefetch processing, particularly referred to as an OF stage 38.

The R stage 37 and the OF stage 38 do not necessarily operate simultaneously, the operation timing being different from each other depending upon miss and hit of the data cache, and miss and hit of data TLB.

The micro ROM access processing which is the processing in the R stage 37 is the micro ROM access and the microinstruction decode processing for generating the E code 45, which is the execution control code used in execution in the next E stage 35 for the R code 43.

In the case where one processing for the R code is decomposed into two or more microprogram steps, there may be the case where the first micro ROM unit 113 and the second micro ROM unit 114 are used in the E stage 35 and the next R code 43 is in the waiting state of micro ROM access.

Micro ROM access for the R code 43 is performed when it is not performed in the E stage 35.

In the data processor 100 of the present invention, since a number of integer operation instructions are executed in one microprogram step and many floating-point operation instructions are executed in two microprogram steps, in practice, there is a high frequency of performing the micro ROM access sequentially for the R code 43.

(4.2.5) "Operand Fetch Stage"

The operand fetch stage (OF stage) 38 executes the operand prefetch processing of the aforesaid two processings in the F stage 34.

In the operand fetch stage 38, the logical address of the F code 44 is translated into the physical address by data TLB, and by the physical address, the built-in data cache is accessed to fetch the operand, which is combined with the logical address transferred as the F code 44 and outputted as the S codes 46a, 46b.

In one F code 44, though an 8-byte border may be crossed, the operand fetch less than 8 bytes is selected.

In the F code 44, selection whether or not to access the operand is involved, and when the operand address itself or the immediate value calculated in the A stage 33 is transferred to the E stage 35, the operand prefetch is not performed and the content of F code 44 is transferred as the S codes 46a, 46b.

In the case where the operand to be prefetched and the operand to be written by the E stage 35 are coincided, the operand prefetch is not performed from the built-in data cache but through the by-path.

The operation of the operand store stage 36 is performed in the operand access unit 120, and the address translation processing and the permuting processing of the built-in data cache, in the case the data TLB or the built-in data cache made a miss, are also performed.

(4.2.6) "Execution Stage"

The execution stage (E stage) 35 operates with the E code 45 and the S codes 46a, 46b as inputs.

The E stage 35 is the instruction executing stage, thus the processings performed in stages before and in the F stage 34 are all pre-processings for the E stage 35.

When a jump is performed or the EIT processing is started in the E stage 35, the processings from the IF stage 31 to the F stage 34 are all repealed.

The E stage 35 is controlled by the microprogram and executes the instruction by executing a series of instructions from the entry address of the microprogram routine indicated in the R code 45.

In the E code 45, there are a code (particularly referred to as an EI code) which controls the integer operation unit 117, and a code (particularly referred to as an EF code) which controls the floating-point operation unit 118. The EI code and EF code are able to output independently, and at this time, in the E stage 35, the integer operation unit 117 and the floating-point operation unit 118 operate in parallel.

For example, when executing the floating-point instruction having no memory operand in the floating-point operation unit 118, this operation is executed in parallel to the operation of the integer operation unit 117.

In both the integer operation and the floating-point operation, read-out of the micro ROM and execution of the microinstruction is executed in the pipeline processing. Accordingly, when the branch occurs in the microprogram, there is a space of one microstep.

In the E stage 35, the write reservation for the register or memory performed in the A stage 33 is released after writing the operand.

Various interruptions are received directly in the E stage 35 at an interval of instructions, and the necessary processing is executed by the microprogram. The other various EIT processings are also performed in the E stage 35 by the microprogram.

When the operation result must be stored in the memory, the E stage 35 outputs the W codes 47a, 47b and the program counter value of the instruction performing the storing processing to the S stage 36.

(4.2.7) "Operand Store Stage"

The operand store stage 36 translates the logical address 47a of the W code into the physical address by data LTB, and stores data 47b of the W code in the built-in data cache by the address. Simultaneously, the operand store stage 36 inputs the W codes 47a, 47b and the program counter value in the store buffer, and processes to store the W code data 47b in the external memory using the physical address outputted from the data TLB.

The operation of the operand store stage 36 is performed in the operand access unit 120, and also the address translation processing and the permuting processing of the built-in data cache, in the case where the data LTB or the built-in data cache made a miss are performed.

When an EIT is detected in the store processing of the operand, while holding the W codes 47a, 47b and the program counter value in the store buffer, the EIT is noticed to the E stage 35.

(4.3) "State control of Each Pipeline Stage"

Each pipeline stage includes an input latch and an output latch, and basically, operates independently of the other stages.

Each of the stages, when the processing performed one before is completed, transfers the processing result to the input latch in the next stage from the own output latch, and starts the next processing when all of the input signals necessary for the next processing are ready in the input latch of the own stage.

That is, each stage starts the next processing when all of the input signals for the next processing outputted from the preceding stage become effective, and the processing result at that time point is transferred to the input latch of the later stage, and the output latch becomes empty.

All input signals must be ready at the time point immediately before each of the stages starts the operation. In the case where tile input signals are not ready, this stage becomes the waiting state (input waiting).

When transferring from the output latch to the input latch of the next stage, the input latch of the next stage must be empty. Even in the case where the next stage input latch is not empty, the pipeline stage is in the waiting state (input waiting).

When the cache or the TLB made a miss or data interference occurs between the instructions being processed in the pipeline, a plural number of clocks are necessitated for the processing of one stage, results in delay of the pipeline processing.

(5) "Construction of PSW, FMC, and FSW"

(5.1) "Construction of PSW (Processor Status Word )"

Figures 24A, 24B:
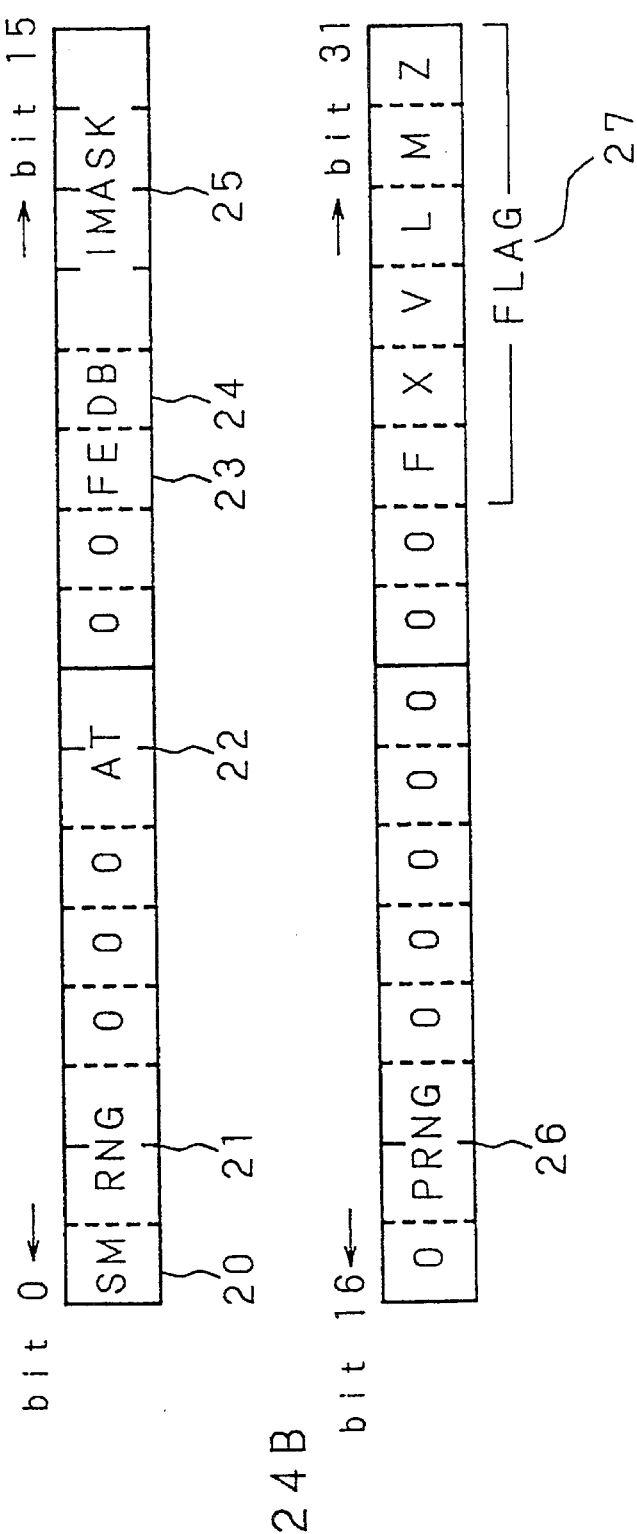
FIG. 24 is a schematic view to illustrate a processor status word (PSW) of the data processor of the present invention.

FIG. 24 is a schematic view to illustrate a processor status word (PSW) which is comprised in the integer operation unit 117 of the data processor of the present invention.

In the figure, reference numeral 20 designates an SM bit which shows either that an interruption processing stack point, is being used in a ring of 0 or that a stack pointer for the ring 0 is being used.

Reference numeral 21 designates an RNG bit (two bits) which shows the number of the ring in which the program is being executed.

Reference numeral 22 designates an AT bit (two bits) which shows modes of address translation and memory protection. AT=00 designates that there is no address translation and no memory protection, AT=10 designates that there is no address translation but memory protection, and AT=01 designates that there is address translation, respectively.

Reference numeral 23 designates an FE bit which shows a mode to activate the floating-point operation trap. In the case where FE=1, the floating-point operation trap which is not being masked is generated at the end of a optional instruction. And in the case where FE=0, generation of the floating-point operation trap which is not being masked is made to delay until just before execution of the next floating-point operation instruction of the floating-point operation instruction which generated that floating-point operation trap or execution of a wait instruction which allows the data processor 100 of the present invention to be the state of waiting interruption.

References numeral 24 designates a DB bit which shows debug environment. In the case where DB=1, the debug environment is ON, and when debug conditions are established, a self-debug trap is activates. An in the case where DB=0, the debug environment is OFF, and even where the debug conditions are established, the self-debug trap will not be activated.

Reference numeral 25 designates an IMASK bit (four bits) which shows a mask level of external interruption. Where external interruption of the higher order of priority than the mask level shown in the IMASK 25 is inputted to the data processor 100 of the present invention, interruption processing is activated.

Reference numeral 26 designates a PRNG bit (two bits), showing the number of the ring which called the present ring.

Reference numeral 27 designates an FLAG (six bits) which shows a flag related to the integer operation.

Incidentally, when resetting, the PSW are cleared to be all zero. According to an LDC instruction and an STC instruction, it is possible to read the content of PSW and to write the specified content.

(5.2) "Construction of Floating-Point Operation Mode Control Register (FMC)"

Figure 25A:
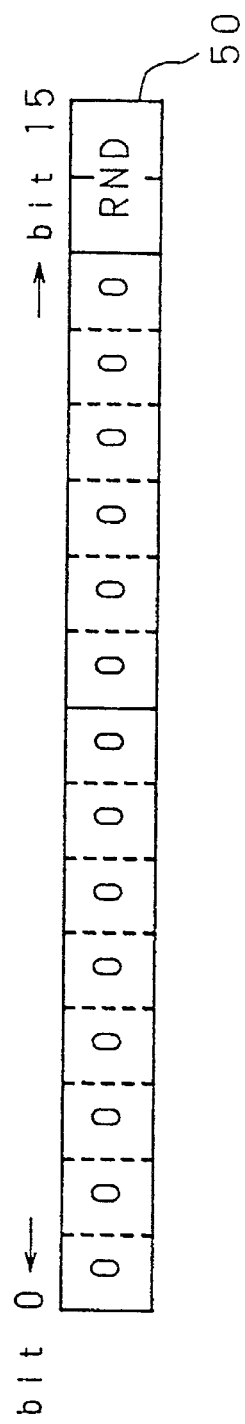
FIG. 25 is a schematic view to illustrate construction of a floating-point operation mode control register (FMC) of the data processor of the present invention.
Figure 25B:
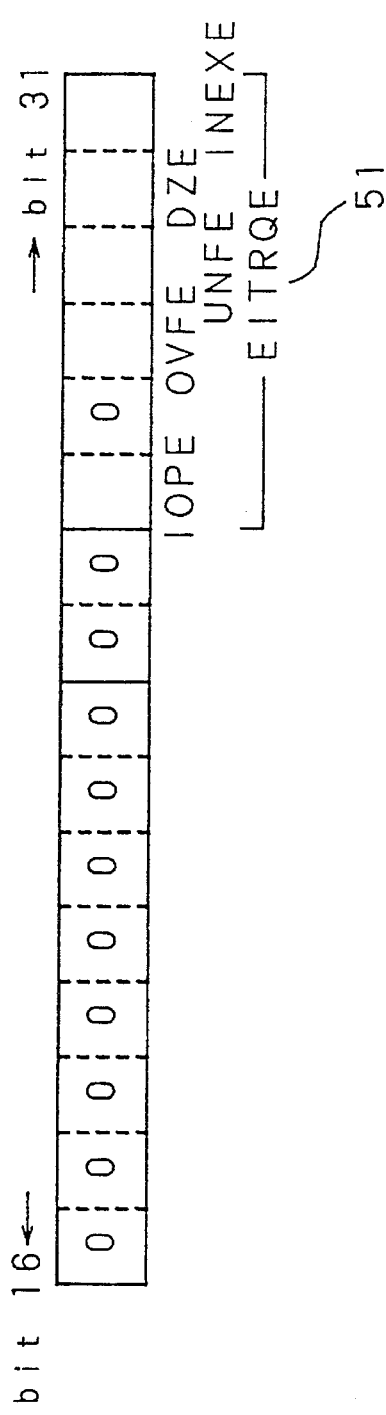
Figure 27:
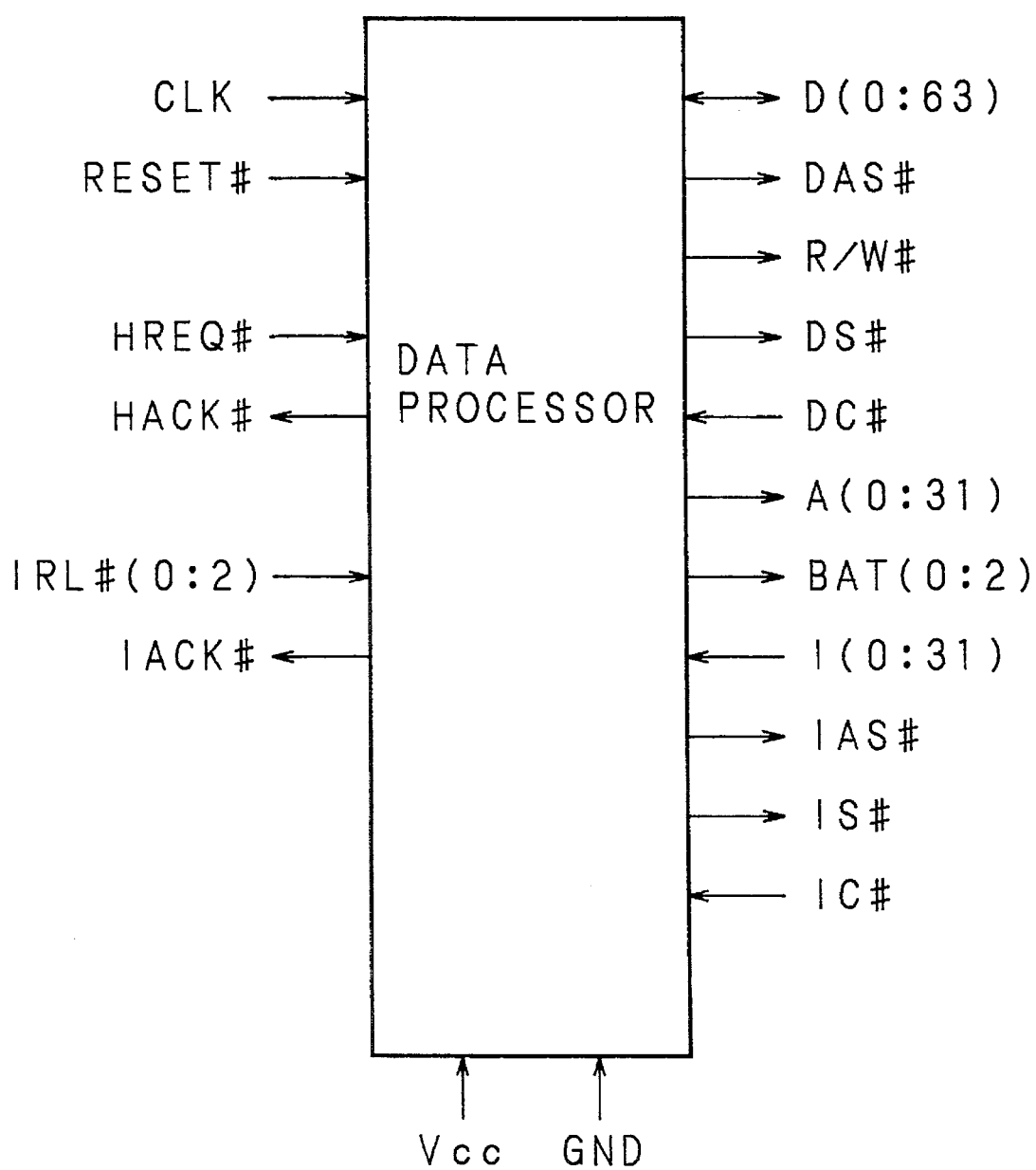
FIG. 27 is a schematic view showing the input/output signals of a data processor of the present invention.

FIG. 25 is a schematic view to illustrate construction of the floating-point operation mode control register (FMC) which is comprised in the floating-point operation unit 118 of the data processor of the present invention.

In the figure, RND 50 of two bits designates a rounding mode of floating-point operation which is specified by U.S. IEEE Standard.

The floating-point operation is rounded in its vicinities in the case where RND=00, the floating-point operation is rounded in the direction of zero in the case where RND=01, the floating-point operation is rounded in the direction of positive infinity where RND=10, and the floating-point operation is rounded in the direction of negative infinity where RND=11.

EITRQE 51 designates authorization of a floating-point operation trap which is specified by U.S.IEEE Standard. When a corresponding bit to the floating-point operation trap is 1, the floating-point operation trap is not masked, and when the corresponding bit is 0, the floating-point operation trap is masked.

IOPE in the EITRQE 51 corresponds to incorrect operation, so does OVFE to floating-point overflow, UNFE to floating-point underflow, DZE to floating-point zero-division, and INEXE to inaccuracy, respectively.

According to the LDC instruction and the STC instruction, it is possible to read the content of the FMC and to write the specified content.

The detailed content of both of the rounding mode of floating-point operation and the floating-point operation trap of the data processor 100 of the present invention is described in ANSI/IEEE Std 754-1985, "IEEE Standard for Binary Floating-Point Arithmetic", for example.

(5.3) "Construction of FSW (Floating-Point Operation State Word)"

FIG. 26 is a schematic view to illustrate construction of the floating-point operation status word (FSW) which is comprised in the floating-point operation unit 118 of the data processor of the present invention.

In the figure, BIAS 52 shows whether exception data which is to be saved in the stack is biased or not when the floating-point operation becomes either overflow or underflow.

EST 53 designates a floating-point operation trap which was generated just before a floating-point operation instruction is executed.

IOP1 in the EST 53 corresponds to incorrect operation, so does IOP2 to overflow when the value of a floating-point is translated into an integer, OVF to overflow of the floating-point, UNF to underflow of the floating-point, DZ to floating-point zero-division, and INEX to inaccuracy, respectively.

CND 54 designates a flag of the execution results of the floating-point operation. N in the CND 54 is set where the execution results are negative, so is Z in the CND 54 where the execution results are zero, I in the CND 54 where the execution results are infinitude, and NAN in the CND when the execution results are nonnumeric, respectively.

In AST 55, there are stored floating-point traps which were generated when the floating-point operation instruction were executed. IOPA in the AST 55 corresponds to incorrect operation, OVFA to overflow of the floating-point, UNFA to underflow of the floating-point, DZA to the floating-point zero-division, and INEXA to inaccuracy, respectively.

Incidentally, according to the LDC instruction and the STC instruction, it is possible to read the content of the FSW and to write the specified content.

(6) "External Access Operation"
(6.1) "Input/Output Signal Line"

FIG. 24 is a schematic view showing the input/output signals of the data processor 100 of the present invention.

To and from the data processor 100 of the present invention, besides a power source Vcc and ground GND, 64 data pins, 32 access pins, 32 instruction pins and an input clock CLK, various control signals are inputted and outputted.

In both cases of instruction access and data access, the physical address is outputted to the address pins.

The CLK is an external input clock which has a same frequency as an operation clock of the data processor 100 of the present invention.

Data address strobe DAS# (# represents a negative logic) indicates that the data address outputted to the address pin is effective.

Read write R/W# discriminates whether a bus cycle at the data pin is the input or output.

Data strobe DS# indicates that the data processor 100 of the present invention has completed data input preparation, or that data is outputted from the data processor 100 of the present invention.

DC# is a signal which notices the data processor 100 of the present invention to complete a data access cycle.

BAT(0:2) shows the meaning of values of the address pin, data pin and instruction pin as shown in FIG. 25.

Instruction address strobe IAS# indicates that the instruction address outputted to the address pin is effective.

Instruction strobe IS# indicates that the data processor 100 of the present invention has completed instruction input preparation.

IC# is a signal which notices the data processor 100 of the present invention to allow completion of an instruction access cycle.

Hold request HREQ# is a signal which requests the bus authority to the data processor 100 of the present invention, and HACK# is a signal which indicates that the data processor 100 of the present, invention has accepted the hold request HREQ# and given the bus authority to the other device.

IRL(0:2) is an external interruption request signal.

IACK# is a signal which indicates that the data processor 100 of the present invention has accepted the external interruption and performing an interruption vector access cycle.

(6.2) "Access of External Devices"

In an example of the system shown in FIG. 1 using the data processor 100 of the present invention, the data processor 100 of the present invention and the data caches 107, 108 are connected also at the BAT(0:2), DAS#, R/W#, DS# and DC# besides the data bus 102 connected to the data pins and the address bus 101 connected to the address pins.

The data processor 100 of the present invention and the instruction cache 11 are connected also at the BAT(0:2), IAS#, IS# and IC# besides the instruction bus 103 and the address bus 101 connected to the instruction pins.

The CLK is a clock fed to the entire system and deciding the basic timing of the system.

At the time of bus access in a standard access mode, the data access using the data bus 102 and the instruction access using the instruction bus 103 are performed respectively for the external memory having a sufficient high speed, at the speed of once in two cycles of the external input clock CLK.

At the time of bus access in a quad access mode, the data access using the data bus 102 and the instruction access using the instruction bus 102 are performed respectively for the external memory having a sufficient high speed, at the speed of four times ill five cycles of the external input clock CLK.

The address bus 101 is utilized for accessing both the data caches 107, 108 and the instruction cache 106.

(7) "Exception Processing Function of the data processor of the Present Invention"

(7.1) "Types of EIT detected by the Data Processor of the Present Invention"

As the EIT occurs in the data processor 100 of the present invention, as the EIT not depending on the instruction, there are a missing page exception which is detected when there are no data and instruction corresponding to the logical address accessed on the main memory 109 and the page fault has occurred, an address translation exception which occurs when an error occurs while translating the logical address into the physical address, and a violence access related to memory protection violation and the I/O area occurs, and a bus access exception which occurs when there is no response from the bus within a predetermined time and the memory access is not executed in the instruction or operand access.

As the EIT occurs depending the instruction, there are an odd address jump trap which occurs when the jump destination address of the jump instruction is an odd number, a reserve instruction exception which occurs when the unallocated instruction and a bit pattern of the addressing mode are to be executed, a zero divide trap which occurs when zero divide is performed in the integer operation, a floating-point operation trap which occurs when the unmasked exception is detected at executing the floating-point instruction, an unconditional trap which occurs by the TRAPA instruction and a conditional trap which occurs by the TRAP/cc instruction.

In addition, there are a self debug trap which occurs when the instruction address hits a breakpoint or the instruction is executed in the single step mode, and further, an external interruption which occurs by external hardware signals and a debugger interruption which is a hardware trap for incircuit emulator.

(7.2) "Operation at starting EIT Processing Handler"

In the data processor 100 of the present invention, when the EIT is detected, the microprogram according to the following procedures is executed and the EIT processing handler is startled.

Firstly, a vector number responsive to the detected EIT is generated in the data processor 100 of the present invention.

Secondly, an EIT vector table which is on the memory space, and in which a start address of the processing handler relative to respective EITs and an EIT vector are stored in a pair is accessed.

Each entry of the EIT vector table is constituted by 8 bytes, and data for updating processor status word (PSW) of the data processor 100 of the present invention before the processing is moved to the EIT processing handler is included.

Thirdly, NEXTPC which is the logical address of the return destination instruction for returning to the original instruction sequence after returned from the EIT processing handler, PSW before staring the EIT and EITINF which is various information related to the detected EIT such as the detected EIT number are saved in the stack.

Moreover, when necessary, information such as the logical address of the instruction detecting the EIT is saved in the stack.

The stack frame generated by these processings are dependent on the types of EIT, and classified into five formats as shown in FIG. 26.

Fourthly, PSW is updated in response to the EIT vector table entry which is read in. At this time, when the reserved value tends to be set in the PSW, a system error occurs. By updating the PSW, a ring number which becomes memory protection information can be updated and the presence or absence of the address translation, debug environment, interruption mask level and floating-point operation trap receipt mode can be permuted.

Finally, a jump to the PC value fetched from the EIT table entry is performed and the EIT processing handler is started. When the EIT is detected in multiple and the unprocessed EIT is not inhibited, before executing the start instruction of the EIT processing handler, processing for starting the EIT processing handler for the unprocessed EIT is performed.

(7.3) "Return Operation to Original Instruction Train from EIT Processing Handler"

After completing the processing corresponding to each EIT by the EIT processing handler, in the REIT instruction executed at the end in the EIT processing handler, the microprogram which performs the following processings is executed, and the processing returning to the original instruction train is performed.

Firstly, the PSW value and EITINF at the time point where the EIT is detected are read from the stack, and successively, logical address of the return destination instruction is read from the stack.

Moreover, by format information in the EITINF, it is judged whether additional information is present, in the case where there is the additional information, it is read from the stack. The additional information differ respectively depending on five formats shown in FIG. 26.

Secondly, all fields of the PSW are returned to the value before the generation of EIT according to the PSW value at the time point where the EIT read from the stack is detected.

When returning from the EIT of format 5, there is a case wherein reexecution of the write cycle is performed during execution of the REIT instruction by the store buffer producing the EIT. In this case, as the logical address and store data necessary for the reexecution of the write cycle, STADDR, STDATAH and STDATAL in the additional information on the stack are used.

Thirdly, a jump to the logical address of the return destination instruction read from the stack is executed, and returned to the original instruction train.

(7.4) "Details of EIT Stack Frame"

An EIT stack frame which is saved in the stack in connection with detection of the EIT and is information becoming a parameter to the EIT processing handler, is classified into five formats shown in FIG. 26 depending on the EIT processing.

A format of format No. 0 is the format of the stack frame formed at the time of reserve instruction exception and external interruption.

A format of format No. 2 is the format of the stack frame formed at the time of the self debug trap, odd address jump trap, zero divide trap, conditional trap and unconditional trap.

A format of format No. 3 is the format of the stack frame formed at the time of the debugger interruption.

A format of format No. 4 is the format of the stack frame formed at the time of the floating-point operation trap.

A format of format No. 5 is the format, of the stack frame formed at the time of the missing page exception, address translation exception and bus access exception.

Figure 29:
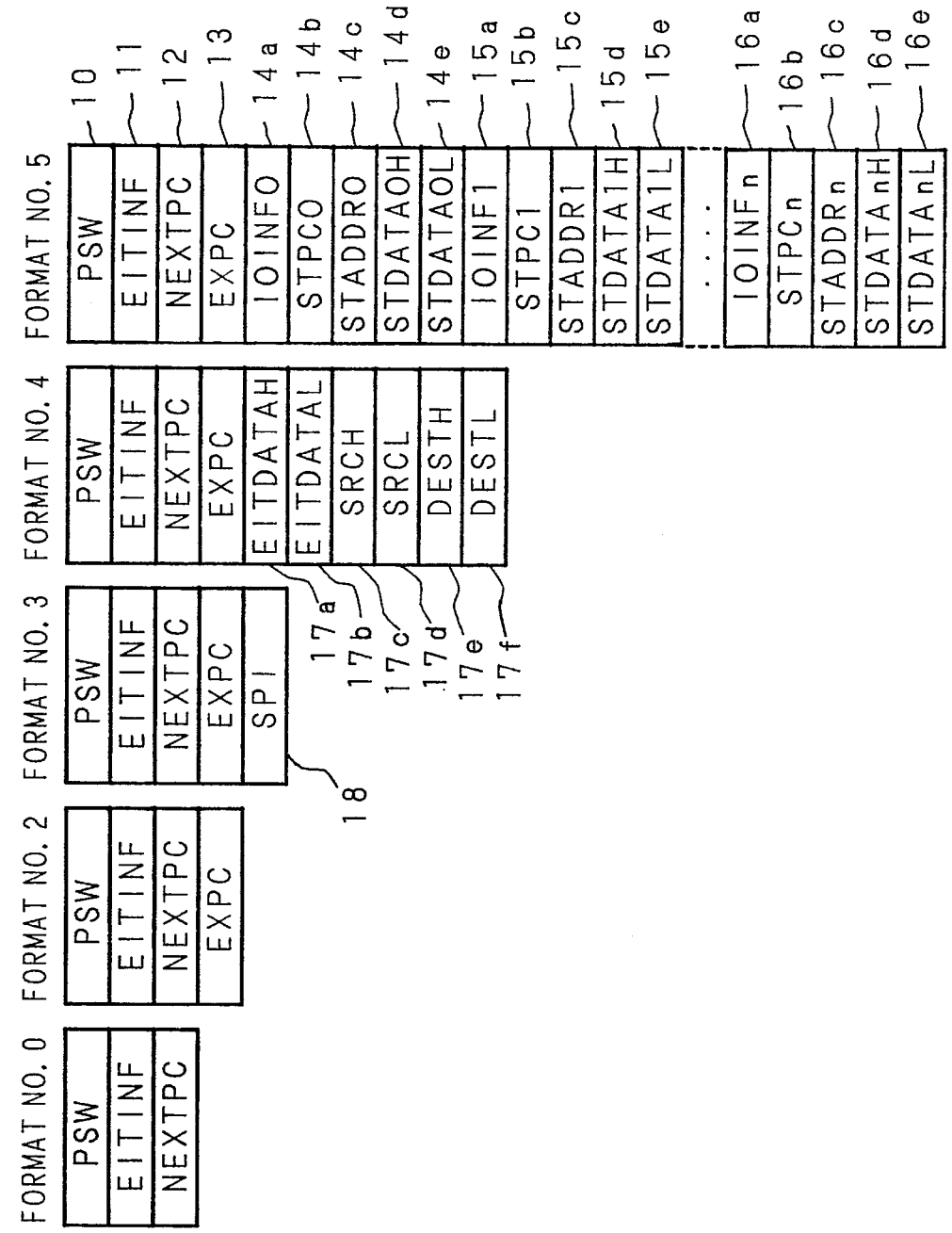
FIG. 29 is a schematic view showing formats of an EIT stack frame a data processor of the present invention.

In FIG. 29, characters and numerals represent the following elements: PSW 10, the value of PSW of the data processor 100 of the present invention when EIT was detected; EITINF 11, control information related to EIT which is comprised of a stack format of an EIT frame, the number of EIT, and the type of EIT; NEXTPC 12, logical address of an instruction which is executed after returning from the EIT processing handler according to REIT instruction; EXPC 13, logical address of an instruction which was being executed at E stage 35 when EIT was detected; IOINF0 14*a*, IOINF1 15*a*, and IOINFn 16*a*, information on unprocessed data in the store buffer to access a memory; STPC0 14*b*, STPC1 15*b*, and STPCn 16*b*, logical address of an instruction which executed storing operation for the unprocessed data in the store buffer; STADDR0 14*c*, STADDR1 15*c*, and STADDRn 16*c*, storing destination logical address of the unprocessed data in the store buffer; STDATA0H 14*d*, STDATA1H 15*d*, and STDATAnH 16*d*, high order for bits of the unprocessed data in the store buffer; STDATA0L 14*e*, STDATA1L 15*e*, and STDATAnL 16*e*, low order four bits of the unprocessed data in the store buffer; EITDATAH 17*a*, high order four bits of the data which became the cause of detecting an exception when a floating-point operation was executed; EITDATAL 17*b*, low order four bits of the data which became the cause of detecting the exception when the floating-point operation was executed; SRCH 17*c*, high order four bits of the first operand of the operation which became the cause of detecting the exception when the floating-point operation was executed; SRCL 17*d*, low order four bits of the first operand of the operation which became the cause of detecting the exception when the floating-point operation was executed; DESTH 17*e*, high order four bits of the second operand of the operation which became the cause of detecting the exception when the floating-point operation was executed; DESTL 17*f*, low order four bits of the second operand of the operation which became the cause of detecting the exception when the floating-point operation was executed; and SPI 18, stack pointer for interruption processing when EIT is detected.

As can be seen from the above description, the data processor of the present invention forms a stack frame which includes a lot of information according to the EIT and transfers required information to an EIT processing handler. Specifically in the format of the format number 4, address of the instruction which generated an exception and two source operands of the operation which generated the exception and operation results which became the cause of generating the exception are all saved in the stack, then, there can be obtained sufficient information required for analyzing the cause of generating the exception and for executing processing to handle the exception in the exception processing handler.

The number of EIT vector, the name of EIT, the type of EIT, and the EIT stack format of each EIT of the data processor of the present invention are shown in a schematic view of FIG. 30.

(7.5) "Operation Example of EIT Processing Handler"

Figure 31:
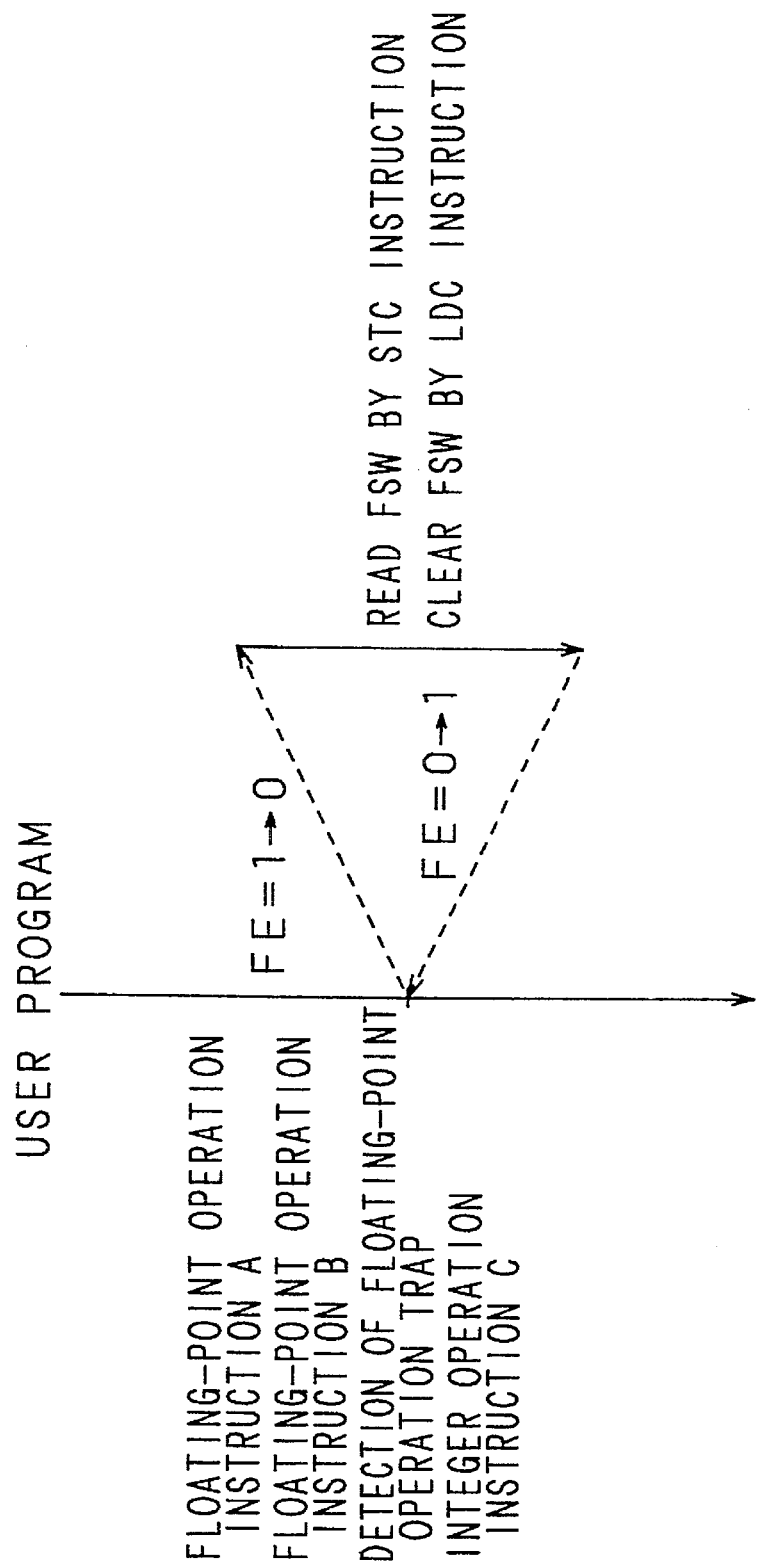
FIG. 31 is a schematic view to illustrate an example of flow of the program in the case where the value of FE bit of PSW is "1" of the data processor of the present invention.

FIG. 31 is a schematic view to illustrate an example of flow of the program in the case where the value of FE bit 23 of PSW is "1" and the integer operation instruction B of a user program is being executed, an unmasked floating-point operation trap is detected according to the floating-point operation instruction A whose execution was initiated before the instruction B, and the floating-point operation trap for the floating-point operation instruction A is activated to execute exception processing in the EIT processing handler at the completion of the integer operation instruction B.

Figure 32:
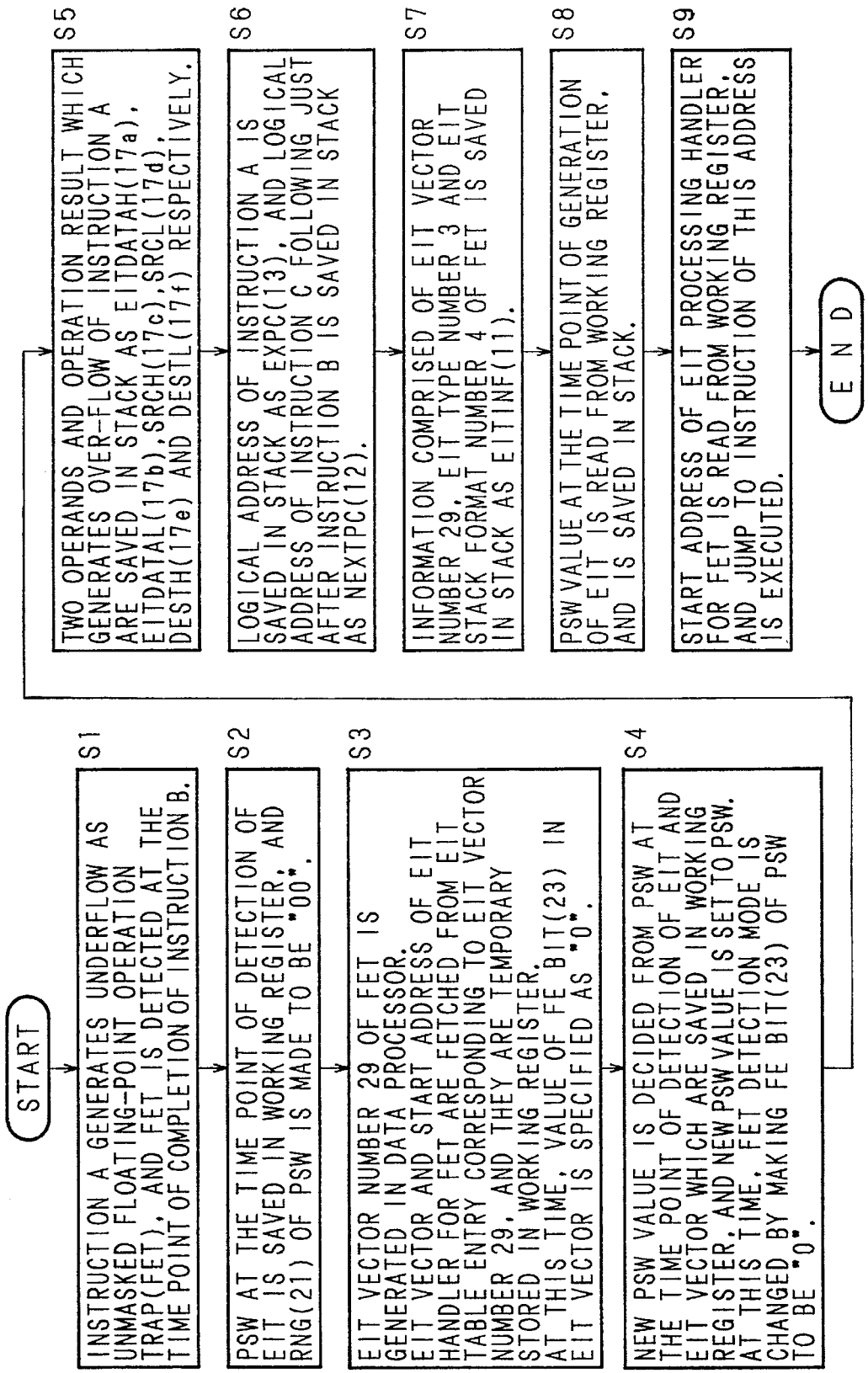
FIG. 32 is a flow chart showing a procedure when the EIT processing handler is activated.
Figure 33:
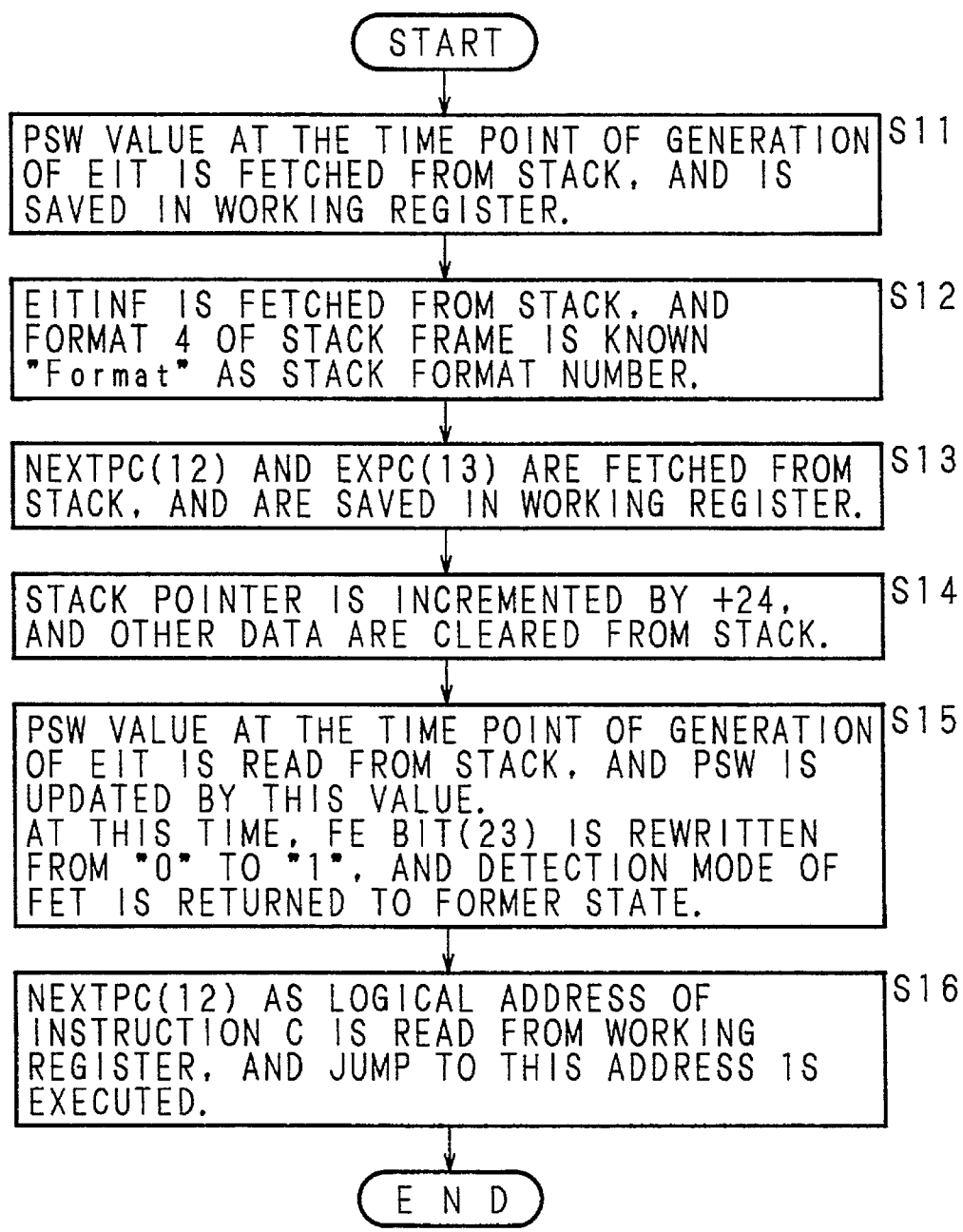
FIG. 33 is a flow chart showing a procedure of processing when returning from the EIT processing handler to the user program is shown in a flow chart of FIG. 33, respectively.

A processing procedure when the EIT processing handler is activated in FIG. 31 is shown in a flow chart of FIG. 32, and a procedure of processing when returning from the EIT processing handler to the user program is shown in a flow chart of FIG. 33, respectively.

First, at the execution of the floating-point operation instruction A, an underflow which is the unmasked floating-point operation trap (FET) is generated, and this underflow is detected when the floating-point operation instruction B is completed (Step S1).

And the PSW at the detection of the EIT is saved in a working register, and RNG 21 of the PSW is set to "00" (Step S2).

Then, the vector number 29 of the EIT is generated in the data processor, and from an EIT table entry corresponding to this vector number 29 of the EIT is fetched an EIT vector for the EIT and start address of the EIT handler, and these values are stored in the working register for a while (Step S3). In this step, the value of FE bit 23 of EIT vector is specified to "0".

After that, a new value of PSW is decided according to the PSW at the detection of EIT vector saved in the working register, being set to the PSW (Step S4). In this step, the value of FE bit 23 of the EIT is set to "0", switching an EIT detection mode.

The two operands of the floating-point operation instruction A and the operation results which caused the overflow are saved in the stack as EITDATAH 17*a*, EITDATAL 17*b*, SRCH 17*c*, SRCL 17*d*, DESTH 17*e*, and DESTL 17*f*, respectively (Step S5).

And, logical address of the floating-point operation instruction A is saved in the stack as EXPC 12 and logical address of an integer operation instruction C which is to be followed just after the integer operation instruction B is saved in the stack as NEXTPC 12 (Step S6).

Then, information comprised of the EIT vector number 29 of FET, the EIT type number 3, and the EIT stack format number 4 are saved in the stack as EITINF 11 (Step S7).

The PSW at the detection of EIT is read from the working register and is saved in the stack (Step S8).

Finally, the start address of the EIT handler for the FET is read from the working register and jump is executed to the address (Step S9).

A processing procedure to return to the user program is as follows.

First, the value of PSW at the generating of EIT is fetched from the stack and is saved in the working register (Step S11).

And, EITINF is fetched from the stack, and a format 4 of the stack frame becomes distinct from a Format being the stack format number (Step S12).

After that, NEXTPC 12 and EXPC 13 are fetched from the stack and are saved in the working register (Step S13).

Then, increment of "+24" is given to the stack pointer, and the other data are cleared from the stack (Step S14).

The value of PSW at the generating of the EIT is read from the working register, and according to this value, the PSW is updated (Step S15). At this step, the FE bit 23 is rewritten from "0" to "1" and the FET detection mode returns to its former state.

Finally, NEXTPC 12 which is the logical address of the instruction C is read from the working register and jump is executed to the address (Step S16).

In this example, the user program is executed when the FE bit 23 of PSW becomes "1", and when the floating-point operation trap is activated, switch of the FE bits 23 of PSW to "0" is specified according to the EIT vector for the floating-point operation trap, and then, the EIT processing handler is executed while the FE bit 23 of PSW is being "0".

In the EIT processing handler, according to both of the content of FSW which was read in response to the STC instruction and various kinds of information for the floating-point operation trap which was saved in the stack, processing of the exception for the generated floating-point operation trap is executed, and EST 53 of FSW is cleared in response to the LDC instruction. Thereafter, by executing the REIT instruction, PSW returns to its former state, and the FE bit 23 of PSW becomes "1", and the processing is made to return to the integer operation instruction C which is followed just after the integer operation instruction B of the user program.

(8) "Other Embodiments of the Present Invention"

The above-mentioned embodiment is one example of construction of the data processor of the present invention. Construction of each function block does not necessarily need to be the same as that of each function block of the above embodiment. For example, it is not intended that a place to locate the PSW be limited to the integer operation unit, other suitable place, such as a control unit, may be employed.

In addition, the format of the EIT stack frame of the floating-point operation trap is not necessarily be as the above embodiment. There can additionally be set another format, such as a format which does not include the data related to both of the address of the floating-point operation which generated the exception and the exception.

In accordance with the first invention of the data processor of the present invention, the integer operation instruction which is the first instruction is executed in the integer operation unit which is the first operation unit, the floating-point operation instruction is executed in the floating-point operation unit which is the second operation unit and which operates in parallel relation with the integer operation unit, and the timing of accepting the floating-point operation trap which was generated in the floating-point operation unit is switched according to the value of the FE bit in the processor status word, thereby, it is selected either that the floating-point operation trap is accepted immediately at the end of the instruction being on execution in the integer operation unit or that even if the floating-point operation trap is generated, execution of the instruction in the integer operation unit is continued and the floating-point operation trap is accepted just before the next floating-point operation instruction is executed in the floating-point operation unit.

As a result, a mode that processing of detecting the generated floating-point operation trap is either executed immediately or delayed until before execution of the next floating-point operation instruction can be controlled by software. Accordingly, where the generated floating-point operation trap is detected immediately, few instructions are executed after the floating-point operation instruction which generated the floating-point operation trap was executed, and then, it is easy to analyze the cause of generating the floating-point operation trap or to return to the state that the floating-point operation trap was generated.

In addition, the generated floating-point operation trap is masked and is delayed until the time just before execution of the next floating-point operation instruction and wait instruction, thereby, it is possible to give priority to process the following integer operation instruction over to detect the generated floating-point operation trap.

In accordances with the second invention of the data processor of the present invention, switch of the FE bit is assigned with the exception processing vector when the exception processing handler is activated, thereby, it can avoid that the same floating-point operation trap is generated every time at the end of the instruction until the content of the floating-point operation status word is changed to clear the floating-point operation trap generation state in the exception processing handler which was activated for the floating-point operation trap which was generated in the program being on execution in the mode of accepting the floating-point operation trap immediately at the end of the instruction.

In accordance with the third invention of the data processor of the present invention, when a handler return instruction to return from the exception processing handler is executed, the value of FE bit is returned to its original value according to the value of the PSW which was fetched from the stack, thereby, independently from the value of FE bit in the original program, the value of FE bit is set to "0" in the exception processing handler, as a result, after detection of the floating-point operation trap was delayed and the integer operation instruction, a sequence control instruction, or the like was executed, it is possible to return to the original program.

In accordance with the fourth invention of the data processor of the present invention, where the floating-point operation trap is generated when the floating-point operation instruction for the first and the second operands is executed, the exception processing handler is activated after each operand and the operation results which became the cause of detecting the exception were stored in a stack area on an external memory by control of the execution control unit, thereby, according to these values stored in the stack, it is possible to readily analyze the cause of generating the exception and to execute the exception processing in the exception processing handler.

In accordances with the fifth invention of the data processor of the present invention, the exception processing handler is activated after the address of the next instruction to be executed, which is the returning destination address from the exception processing handler to the original program, was stored in the stack area on the external memory according to the address of the floating-point instruction which generated the floating-point operation trap and the address of the instruction just before execution when the floating-point operation trap was accepted, thereby, according to these values stored in the stack, it is possible to readily analyze the cause of generating the exception in the exception processing handler and to return to the original program.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A data processor comprising:

an instruction decoding unit for decoding a first type and a second type of instruction;

an instruction execution unit, coupled to said instruction decoding unit, for executing said first and second type of instructions decoded in said instruction decoding unit and for asserting an exception signal when an arithmetic operation exception occurs during processing of said second type of instruction, and wherein said first and said second types of instruction execute independently;

a control unit, coupled to said instruction execution unit for accepting said exception and for activating an exception processing handler;

a register, coupled to said instruction execution unit and to said control unit for selectively controlling the time when said control unit accepts said exception and wherein when the exception signal is asserted during execution of said second type of instruction in said instruction execution unit, said control unit writes a new set of control data to said register, accepts an exception related to said second type of instruction, and activates the exception processing handler; and wherein said first type of instruction is an interger operation instruction and said second type of instruction is a floating-point operation instruction; and wherein each of said first and second types of instructions are executed by said instruction execution unit regardless of the status of the control data in said register.

2. A data processor comprising:

an instruction decoding unit for decoding an instruction;

a first operation unit coupled to said instruction decoding unit for executing a first kind of operation instruction decoded in said instruction decoding unit;

a second operation unit coupled to said instruction decoding unit for executing a second kind of operation instruction decoded in said instruction decoding unit and for outputting an exception signal when an arithmetic operation exception occurs during execution of said second kind of operation instruction;

a control unit, coupled to said second operation unit, for accepting said exception and for activating an exception processing handler when said exception signal is asserted during execution of said second kind of operation instruction;

a register, coupled to said control unit, and to said first operation unit for selectively controlling the time when said control unit accepts said exception, and wherein when said register stores a first value, said control unit accepts said exception and activates the exception processing handler after said first operation unit executes a first given one of said first kind of operation instruction and before said first operation unit executes a next one of said first kind of operation instruction and, when said register stores a second value, said control unit accepts said exception and activates said exception processing after said first operation unit executes a first kind of operation instruction and before said second operation unit executes a next second kind of operation instruction; and wherein each of said first and second kinds of operation instructions are executed by said first and second operation units regardless of the status of the value stored in said register.

3. A data processor as set forth in claim 2, wherein said first kind of operation instruction is an integer operation instruction and said second kind of operation instruction is a floating-point operation instruction.

4. A data processor comprising:

an instruction decoding unit for decoding a plurality of instructions;

a first operation unit, coupled to said instruction decoding unit, for executing a first kind of operation instruction decoded in said instruction decoding unit;

a second operation unit, coupled to said instruction decoding unit, for executing a second kind of operation instruction decoded in said instruction decoding unit and asserting an exception signal when an arithmetic operation exception occurs during processing of said second kind of operation instruction;

a data input/output unit coupled to said first operation unit and to said second operation unit for storing data in an external memory;

a control unit, coupled to said second operation unit and to said data input/output unit, when said exception signal is asserted:

(i) accepting said exception, (ii) activating an exception processing handler when said first operation unit finishes execution of a first given one of said first kind of operation instruction and before execution of a next one of said first kind of operation instruction, and (iii) storing an address of said second kind of operation instruction and an address of said next one of said first kind of operation instruction through said data input/output unit said external memory; and a register, coupled to said first operation unit and to said control unit, for selectively controlling the time when said control unit accepts said instruction; and wherein each of said first and second kinds of operation instructions are executed by said said first and second operation units regardless of the status of said register.

5. A data processor as set forth in claim 4, wherein said first kind of operation instruction is an interger operation instruction and said second kind of operation instruction is a floating-point operation instruction.

* * * * *